United States Patent
Shinohara

(10) Patent No.: US 7,978,984 B2
(45) Date of Patent: Jul. 12, 2011

(54) DATA COMMUNICATION UNIT USING LIGHT-EMITTING DIODE FOR DATA COMMUNICATION, AND ELECTRONIC DEVICE

(75) Inventor: Yoshinori Shinohara, Nagano (JP)

(73) Assignee: Nittoh Kogaku K.K., Tokyo (JP)

( * ) Notice: Subject to any disclaimer, the term of this patent is extended or adjusted under 35 U.S.C. 154(b) by 1114 days.

(21) Appl. No.: 11/557,651

(22) Filed: Nov. 8, 2006

(65) Prior Publication Data

US 2007/0065160 A1  Mar. 22, 2007

(51) Int. Cl.
*H04B 10/24* (2006.01)
*H04B 10/00* (2006.01)
*H04B 10/12* (2006.01)

(52) U.S. Cl. ........ 398/195; 398/135; 398/136; 398/137; 398/138; 398/182; 398/141; 398/164

(58) Field of Classification Search ................... 398/195, 398/192, 182
See application file for complete search history.

(56) References Cited

U.S. PATENT DOCUMENTS

| | | | |
|---|---|---|---|
| 4,099,171 A | 7/1978 | Meyer | |
| 4,151,387 A * | 4/1979 | Peters, Jr. | 219/626 |
| 4,286,171 A | 8/1981 | Hara et al. | |
| 4,564,756 A * | 1/1986 | Johnson | 250/214 R |
| 4,928,067 A * | 5/1990 | Lind | 324/96 |
| 5,189,544 A * | 2/1993 | Sailer | 398/136 |
| 5,255,111 A * | 10/1993 | Kwa | 398/138 |
| 5,541,704 A | 7/1996 | Dunsmore | |
| 5,568,474 A * | 10/1996 | Wissman | 370/294 |
| 6,442,378 B1 * | 8/2002 | Aboukhalil et al. | 455/115.3 |
| 6,449,437 B1 | 9/2002 | Ogawa | |
| 6,535,308 B1 * | 3/2003 | BuAbbud et al. | 398/41 |
| 7,072,587 B2 * | 7/2006 | Dietz et al. | 398/138 |
| 2004/0101311 A1 * | 5/2004 | Grohn | 398/154 |
| 2004/0136726 A1 * | 7/2004 | Escobosa et al. | 398/164 |
| 2004/0212321 A1 * | 10/2004 | Lys et al. | 315/291 |
| 2005/0069327 A1 * | 3/2005 | Franck et al. | 398/141 |
| 2005/0168899 A1 * | 8/2005 | Sato et al. | 361/91.1 |

FOREIGN PATENT DOCUMENTS

| | | |
|---|---|---|
| JP | H6-51716 | 2/1994 |
| JP | H6-67616 | 3/1994 |
| JP | H8-97969 | 4/1996 |
| JP | 2001-119063 | 4/2001 |
| JP | 2001-197253 | 7/2001 |
| JP | 2004-264440 | 9/2004 |
| JP | 2004-333542 | 11/2004 |

* cited by examiner

*Primary Examiner* — Ken N Vanderpuye
*Assistant Examiner* — Oommen Jacob
(74) *Attorney, Agent, or Firm* — Stephen M Chin, Esq.

(57) ABSTRACT

The present invention enables device downsizing by utilizing a light-emitting diode as a plurality of interfaces. A light-emitting diode 11 of a data communication unit using a light-emitting diode for data communication outputs light when a current flows therethrough. A transmission circuit 13 applies a forward bias to the light-emitting diode 11 based on transmission data. A separation circuit 14 outputs a voltage that changes according to a voltage which is generated in the light-emitting diode 11 when the transmission circuit 13 does not apply the forward bias to the light-emitting diode 11.

4 Claims, 12 Drawing Sheets

DATA COMMUNICATION UNIT USING LIGHT-EMITTING DIODE FOR DATA COMMUNICATION, AND ELECTRONIC DEVICE

BACKGROUND OF THE INVENTION

1. Field of the Invention

The present invention relates to a data communication unit using a light-emitting diode for data communication, and an electronic device.

2. Description of the Related Art

Conventional communication systems of data communication units using a light-emitting diode include an infrared communication system and the like standardized by IrDa (Infrared Data Association). This infrared communication system by IrDa uses a light-emitting diode that emits light for data transmission and a photosensor that receives light from a light-emitting diode of another electronic device, and is adopted in electronic devices such as personal computers and mobile phones.

A photosensor and a light-emitting diode are basically semiconductor devices having a PN junction. Therefore, by using a light-emitting diode, it is also possible to receive light, as disclosed in a Japanese Patent Application Laid-open No. 2001-119063 (Abstract, Claims, Detailed Description of the Invention, Drawings, and so on hereinafter referred to as "patent document 1")

The light-emitting diode and the photosensor used in the aforesaid infrared communication unit are disposed on a surface of the electronic device for communication with another electronic device having a communication function. Therefore, providing an electronic device with the infrared communication function standardized by IrDa will be a cause of hindering downsizing of the electronic device and restricting space use efficiency. It will also be a cause of cost increase.

An electronic device generally has a light-emitting part such as a power indication lamp. As this light-emitting part, a light-emitting diode outputting visible light is generally used. Therefore, in order for an electronic device not having a data transmission function to have a data reception function, the electronic device needs to have, on its surface, the light-emitting diode emitting visible light and a photosensor for data reception. The same problem as the aforesaid problem also occurs in this case.

The art disclosed in the patent document 1 is simply to utilize one LED both as a light-emitting element and as a light-receiving sensor. The patent document 1 has no description regarding communication. The patent document 1 does not solve various problems involved in providing the aforesaid communication function.

SUMMARY OF THE INVENTION

It is an object of the present invention to provide a data communication unit and an electronic device using a light-emitting diode for data communication, in which a light-emitting diode is used for a plurality of interfaces, thereby enabling the device downsizing.

A data communication unit using a light-emitting diode for data communication according to the present invention includes: a light-emitting diode outputting light when a current flows therethrough; a transmission circuit applying a forward bias to the light-emitting diode based on transmission data; and a separation circuit outputting a voltage that changes according to a voltage which is generated in the light-emitting diode when the forward bias is not applied to the light-emitting diode. In this data communication unit, the transmission circuit causes the light-emitting diode to transmit optical transmission data, and the separation circuit takes out light received by the light-emitting diode, as data.

With this structure, the data communication unit can cause the light-emitting diode to emit light based on the transmission data, and moreover, can generate a voltage signal corresponding to an optical signal inputted to the light-emitting diode whose light emission is controlled. The data communication unit can transmit data by using the light-emitting diode, and by using this light-emitting diode used for the data transmission, the data communication unit can receive data. The light-emitting diode is utilized as two interfaces, which can realize the downsizing of the data communication unit.

In addition to the above-described structure of the invention, the data communication unit using the light-emitting diode for data communication according to the present invention has the following feature. That is, the transmission circuit intermittently applies the forward bias to the light-emitting diode based on the transmission data, thereby enabling use of the light-emitting diode for data reception even during a period in which the light-emitting diode is driven for light emission based on the transmission data.

With this structure, even during the period in which the light-emitting diode is driven for the light emission based on the transmission data, the data communication unit can receive data by using the light-emitting diode at a timing when the forward bias is not applied during the period. For example, the data communication unit drives the light-emitting diode by a pulse train for each data, which enables full-duplex communication.

The data communication unit using the light-emitting diode for data communication according to the present invention has the following feature in addition to the above-described structures of the invention. That is, the data communication unit has a parallel capacitor connected between an anode node and a cathode node of the light-emitting diode.

With this structure, carriers accumulated in a PN junction part of the light-emitting diode that outputs light when a current flows therethrough are quickly cancelled by the parallel capacitor. This makes it possible to prevent the separation circuit from outputting a high noise voltage ascribable to the accumulated carriers immediately after the application of the forward bias to the light-emitting diode is finished. This enables a filter circuit to output a suitable voltage according to a received optical signal, even during the period in which the light-emitting diode is driven by the pulse train for each data in the full-duplex communication.

The data communication unit using the light-emitting diode for data communication according to the present invention has the following feature in addition to the above-described structures of the invention. That is, the transmission circuit of the data communication unit has a PNP transistor having a base node connected to a cathode node of the light-emitting diode and has a collector node connected to an anode node of the light-emitting diode. When applying the forward bias to the light-emitting diode, the transmission circuit controls potentials of the cathode node of the light-emitting diode and the base node of the PNP transistor to a value lower than a voltage of an emitter node of the PNP transistor, thereby turning on the PNP transistor. The separation circuit is connected to the anode node of the light-emitting diode.

With this structure, a potential of the anode node of the light-emitting diode can be in indefinite state +when the forward bias is not applied to the light-emitting diode. The light-emitting diode with no forward bias being applied thereto is capable of generating a voltage according to light incident thereon and outputting the voltage to the separation circuit.

The data communication unit using the light-emitting diode for data communication according to the present invention has the following feature in addition to the above-described structures of the invention. That is, the separation circuit of the data communication unit has: a separation transistor; a DC removing capacitor connected between a base node of the separation transistor and an anode node of the light-emitting diode; an operating point setting circuit; and a separation resistor element connected to a collector node of the separation transistor. The operating point setting circuit has a pair of resistor elements connected to the base node of the separation transistor and sets an operating potential of the separation transistor so as to cause the separation transistor to perform a current amplifying operation according to whether or not a predetermined amount of light is incident on the light-emitting diode.

With this structure, a voltage signal outputted from the separation circuit does not easily change depending on voltage change that occurs in the anode node when the light-emitting diode emits light. The voltage signal outputted from the separation circuit based on voltage change of the separation resistor element becomes a signal that changes according to light incident on the light-emitting diode.

The data communication unit using the light-emitting diode for data communication according to the present invention has the following feature in addition to the above-described structures of the invention. That is, the separation circuit of the data communication unit has: an amplifier transistor having a collector node connected to the base node of the separation transistor and a base node connected to the DC removing capacitor; and a low pass filter circuit removing a high-frequency component from a voltage of the separation resistor element.

With this structure, even if a period in which the transmission circuit applies the forward bias to the light-emitting diode and a period in which the light-emitting diode receives an optical signal based on data overlap with each other or continuously take place and as a result, a pulse width based on an optical signal inputted to the separation circuit is narrowed, the separation circuit is capable of outputting a voltage signal equivalent to a voltage signal that it outputs when no such influence exists.

The data communication unit using the light-emitting diode for data communication according to the present invention has the following feature in addition to the above-described structures of the invention. That is, the low pass filter circuit of the data communication unit allows passage of a frequency component whose period is different from a period of a frequency based on which the transmission circuit applies the forward bias to the light-emitting diode.

With this structure, two data communication units do not transmit/receive data by means of optical signals with the same frequency, which can prevent phases of the optical signals from completely matching each other continuously. Two data communication units each using the light-emitting diode for data transmission/reception can transmit/receive data by means of optical signals different in frequency.

The data communication unit using the light-emitting diode for data communication according to the present invention has the following feature in addition to the above-described structures of the invention. That is, the data communication unit has a differential operational amplifier. This differential operational amplifier compares a waveform of an output voltage of the separation circuit and a waveform of a light emission control signal for applying the forward bias to the light-emitting diode, and outputs an error signal when the waveforms do not match each other.

With this structure, for example, another data communication unit receiving an optical signal that is outputted from the light-emitting diode under the control by the transmission circuit returns an optical signal based on reception data thereof, so that the data communication unit transmitting the data can determine, during the data transmission, whether or not the data in the course of the transmission is correctly transmitted to the other data communication unit.

The data communication unit using the light-emitting diode for data communication according to the present invention has the following feature in addition to the above-described structures of the invention. That is, the light-emitting diode of the data communication unit emits visible light.

With this structure, it is possible to transmit/receive data by using the light-emitting diode emitting visible light.

Another data communication unit using a light-emitting diode for data communication according to the present invention includes: a light-emitting diode outputting visible light when a current flows therethrough; a display circuit applying a forward bias to the light-emitting diode in order to make the light-emitting diode emit light; and a separation circuit outputting a voltage that changes according to a voltage which is generated in the light-emitting diode when the forward bias is not applied to the light-emitting diode. Further, in the data communication unit, the display circuit causes the light-emitting diode to emit light and the separation circuit takes out light received by the light-emitting diode, as data.

With this structure, the data communication unit is capable of causing the light-emitting diode to emit light, and moreover, is capable of generating a voltage signal corresponding to an optical signal inputted to the light-emitting diode whose light emission is controlled. The data communication unit is capable of receiving data by using the light-emitting diode whose emission of visible light is controlled, which can realize the downsizing of the data communication unit. The light-emitting diode is utilized as an interface with a user by emitting the visible light and is utilized as an interface for data reception, which can realize the downsizing of the data communication unit.

An electronic device of the present invention includes: a data communication unit performing data communication; and a controller controlling the data communication performed by the data communication unit. The data communication unit includes: a light-emitting diode outputting light when a current flows therethrough; a transmission circuit applying a forward bias to the light-emitting diode based on transmission data; and a separation circuit outputting a voltage that changes according to a voltage which is generated in the light-emitting diode when the forward bias is not applied to the light-emitting diode. In this data communication unit, the transmission circuit causes the light-emitting diode to transmit optical transmission data, and the separation circuit takes out light received by the light-emitting diode, as data.

With this structure, the electronic device can optically transmit data by using the light-emitting diode, and in addition, can receive data by using the light-emitting diode whose light emission is controlled. The light-emitting diode is utilized as two interfaces, which can realize the downsizing of the electronic device.

Another electronic device according to the present invention includes: a data communication unit performing data communication; and a controller controlling the data communication performed by the data communication unit. The data communication unit includes: a light-emitting diode outputting visible light when a current flows therethrough; a display circuit applying a forward bias to the light-emitting diode in order to make the light-emitting diode emit light; and a separation circuit outputting a voltage that changes according to a voltage which is generated in the light-emitting diode when the forward bias is not applied to the light-emitting diode. Further, in the data communication unit, the display circuit causes the light-emitting diode to emit light and the separation circuit takes out light received by the light-emitting diode, as data.

With this structure, in the electronic device, the light-emitting diode is utilized as an interface with a user by emitting the visible light and is utilized as an interface for data reception. The light-emitting diode is utilized as the two interfaces, which can realize the downsizing of the electronic device.

The electronic device according to the present invention has the following feature in addition to the above-described structures of the invention. That is, the electronic device is one device selected from a residual image forming tool that forms a residual image when held and waved by a person's hand, a display panel device, an electronic locking device, a key unit, a broadcast receiver, a personal computer, a game machine, a lighting device, an air conditioner, a hot-water supplier, a microwave oven, a camera, a household electric apparatus, an automobile, a motorcycle, a portable telephone terminal, a portable information device, a portable game machine, and an evaluation board.

With this structure, the light-emitting diode can be used in various electronic devices as a plurality of interfaces including an interface for data reception, which can realize device downsizing.

In the present invention, the light-emitting diode is used as a plurality of interfaces, which enables device downsizing.

The present invention can be utilized for downsizing an electronic device and the like having a light-emitting diode.

DETAILED DESCRIPTION OF THE PREFERRED EMBODIMENTS

Hereinafter, data communication units and electronic devices that use a light-emitting diode for data communication according to embodiments of the present invention will be described based on the drawings. The data communication units using the light-emitting diode for data communication will be described as part of the electronic devices using the light-emitting diode for data communication.

In the description of embodiments 1 and 2, a general-purpose electronic device that uses a light-emitting diode for data transmission/reception is taken as an example. In the description of an embodiment 3, a swing-type aerial display device using light-emitting diodes for data transmission/reception is taken as an example. In the description of an embodiment 4, a display panel device using display light-emitting diodes for data reception is taken as an example.

Embodiment 1

Figure 1:
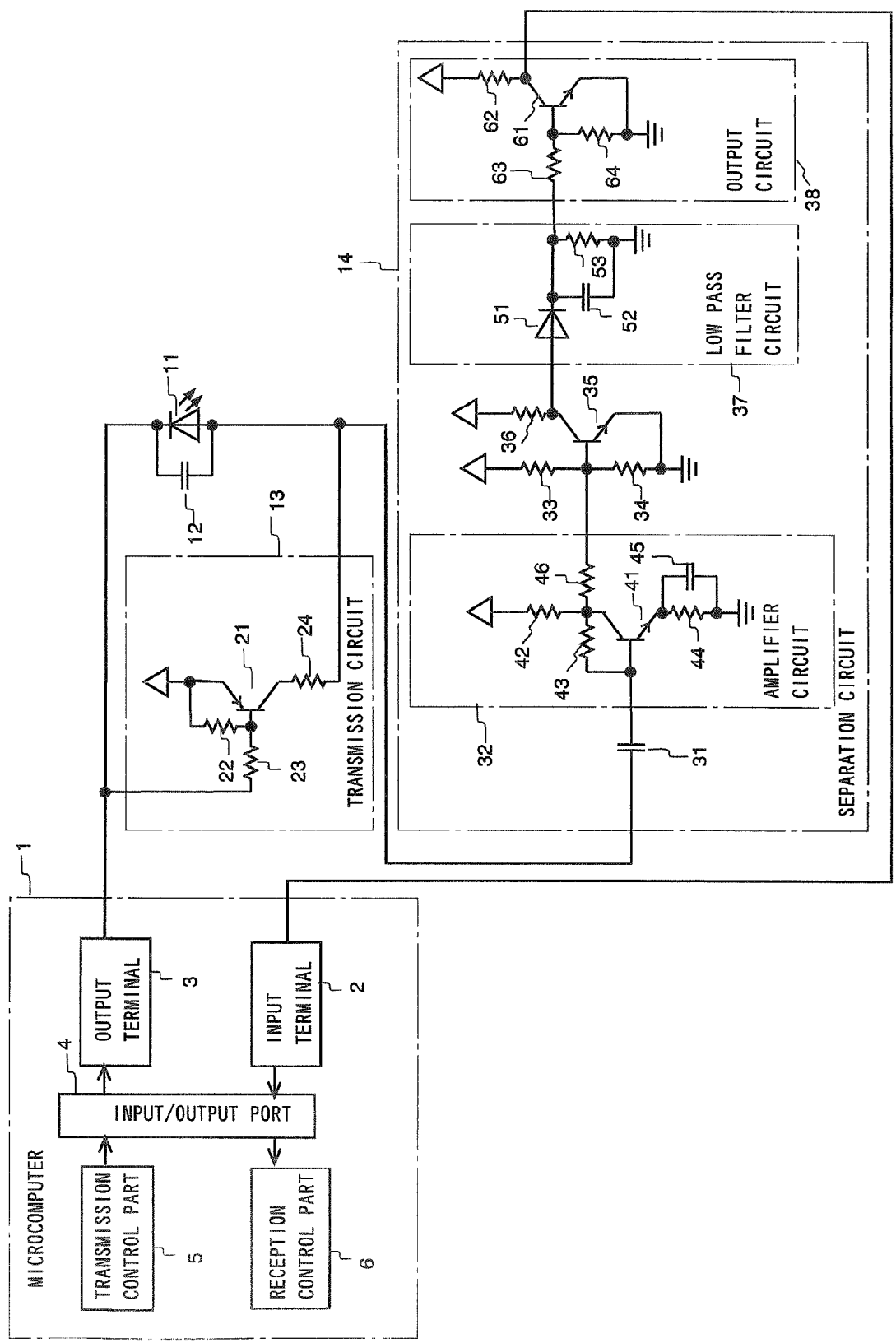
FIG. 1 is a block diagram showing an electronic device using a light-emitting diode for data communication, according to an embodiment 1 of the present invention.

FIG. 1 shows the configuration of an electronic device using a light-emitting diode for data transmission/reception, according to the embodiment 1 of the present invention. The electronic device has a microcomputer 1. The microcomputer 1 has an input terminal 2 and an output terminal 3. The input terminal 2 and the output terminal 3 are connected to an input/output port 4 of the microcomputer 1.

The input/output port 4 outputs a voltage level according to a digital value set therein. For example, when a digital value "0" is set, the input/output port 4 controls the output terminal 3 to a ground potential whereas, when a digital value "1" is set, it controls the output terminal 3 to a power supply potential. The input/output port 4 outputs a digital value according to a voltage level of the input terminal 2. For example, when the input terminal 2 has the ground potential, the input/output port 4 outputs a digital value "0", and when the input terminal 2 has the power supply potential, it outputs a digital value "1".

In the microcomputer 1, a transmission control part 5 as part of a controller and a reception control part 6 as part of the controller are realized. The transmission control part 5 sets the digital value of the input/output port 4 based on a predetermined communication protocol for data transmission. The reception control part 6 reads the digital value outputted by the input/output port 4 to decode the digital value based on a predetermined communication protocol to generate reception data.

The transmission control part 5 and the reception control part 6 are realized by a not-shown central processing unit executing a communication control program stored in a not-shown memory in the microcomputer 1. The communication control program may be written in the memory in the microcomputer 1 either after or before the shipment of the electronic device. Further, the communication control program written in the memory in the microcomputer 1 after the shipment may be stored in a computer-readable recording medium or downloaded via a transmission medium such as an electric communication line.

The electronic device has, in addition to the microcomputer 1, one light-emitting diode 11, a parallel capacitor 12, a transmission circuit 13, and a separation circuit 14.

The light-emitting diode 11 has a structure in which P-type and N-type semiconductors are joined together. The light-emitting diode 11 emits light when a forward bias is applied thereto, the forward bias causing a potential on the P-type semiconductor side potential of an anode node) to be higher than a potential of the N-type semiconductor side (potential of a cathode node). While reverse bias or no bias is applied thereto, the light-emitting diode 11 is extinguished. The light-emitting diode 11 of this embodiment outputs infrared rays.

When light is incident on a PN junction part of the light-emitting diode 11, holes and electrons are separately generated in the vicinity of the PN junction part due to a photoexcitation phenomenon. The holes generated by the photoexcitation phenomenon diffuse to the anode node side to be accumulated in the P-type semiconductor. The electrons generated by the photoexcitation phenomenon diffuse to the cathode node side to be accumulated in the N-type semiconductor. Due to the generation/separation of the holes and the electrons, a current flows through the light-emitting diode 11.

The parallel capacitor 12 is connected in parallel to the light-emitting diode 11. One node of the parallel capacitor 12 is connected to the anode node of the light-emitting diode 11 and the other node thereof is connected to the cathode node of the light-emitting diode 11.

The cathode node of the light-emitting diode 11 and the other node of the parallel capacitor 12 are connected to the output terminal 3 of the microcomputer 1.

The transmission circuit 13 has a PNP transistor 21, a first resistor element 22, a second resistor element 23, and a protective resistor element 24.

The PNP transistor 21 turns on when a potential of its base node becomes lower than a potential of its emitter node by a predetermined voltage or more. A current flows from the emitter node to a collector node. The emitter node of the PNP transistor 21 is connected to a power source. The collector node of the PNP transistor 21 is connected to one node of the protective resistor element 24. The other node of the protective resistor element 24 is connected to the anode node of the light-emitting diode 11 and the one node of the parallel capacitor 12.

The base node of the PNP transistor 21 is connected to one node of the first resistor element 22 and one node of the second resistor element 23. The other node of the first resistor element 22 is connected to the power source. The other node of the second resistor element 23 together with the cathode node of the light-emitting diode 11 and the other node of the parallel capacitor 12 is connected to the output terminal 3 of the microcomputer 1.

In such a connection state of the transmission circuit 13, when the output terminal 3 of the microcomputer 1 has, for example, the power supply potential, the potentials of the base node and the emitter node of the PNP transistor 21 become substantially equal to each other. The PNP transistor 21 turns off. No current flows from the emitter node to the collector node of the PNP transistor 21. The light-emitting diode 11 is extinguished.

When the output terminal 3 of the microcomputer 1 has, for example, the ground potential, a current flows through the first resistor element 22 and the second resistor element 23. The potential of the base node of the PNP transistor 21 comes to be equal to the power supply voltage divided by a ratio of a resistance value of the first resistor element 22 and a resistance value of the second resistor element 23. The PNP transistor 21 turns on. A current flows from the emitter node to the collector node of the PNP transistor 21. This current flows to the output terminal 3 of the microcomputer 1 via the light-emitting diode 11 and the parallel capacitor 12. The light-emitting diode 11 is lighted.

The light-emitting diode 11 is lighted when the output terminal 3 of the microcomputer 1 has the ground potential and is extinguished when the output terminal 3 has the power supply potential. The light emission of the light-emitting diode 11 is controlled by the microcomputer 1.

The separation circuit 14 has a DC removing capacitor 31, an amplifier circuit 32, a third resistor element 33 as one of a pair of resistor elements and an operating point setting circuit, a fourth resistor element 34 as the other of the pair of the resistor elements and the operating point setting circuit, a separation transistor 35, a separation resistor element 36, a low pass filter circuit 37, and an output circuit 38.

One node of the DC removing capacitor 31 is connected to the anode node of the light-emitting diode 11.

The separation transistor 35 is an NPN transistor. The NPN transistor turns on when a potential of its base node becomes higher than a potential of its emitter node by a predetermined voltage or more. A current flows from a collector node to the emitter node. The emitter node of the separation transistor 35 is connected to a ground. The collector node of the separation transistor 35 is connected to one node of the separation resistor element 36. The other node of the separation resistor element 36 is connected to a power source.

The base node of the separation transistor 35 is connected to one node of the third resistor element 33 and one node of the fourth resistor element 34. The other node of the third resistor element 33 is connected to the power source. The other node of the fourth transistor element 34 is connected to the ground. The potential of the base node of the separation transistor 35 becomes equal to the power supply voltage divided by a ratio of a resistance value of the third resistor element 33 and a resistance value of the fourth resistor element 34. A base node-emitter node voltage of the separation transistor 35 is fixed, and therefore, when the separation transistor 35 is ON, a current of the collector node according to a current of the base node flows through the separation transistor 35. The separation transistor 35 operates in a current amplification mode.

The amplifier circuit 32 has an amplifier transistor 41, a fifth resistor element 42, a sixth resistor element 43, a seventh resistor element 44, a first capacitor 45, and an eighth resistor element 46.

The amplifier transistor 41 is an NPN transistor. A collector node of the amplifier transistor 41 is connected to one node of the fifth resistor element 42, one node of the sixth resistor element 43, and one node of the eighth resistor element 46. The other node of the eighth resistor element 46 is connected to the base node of the separation transistor 35.

The other node of the fifth resistor element 42 is connected to the power source. The other node of the sixth resistor element 43 is connected to the other node of the DC removing capacitor 31. The other node of the sixth resistor element 43 is connected to a base node of the amplifier transistor 41. An emitter node of the amplifier transistor 41 is connected to one node of the seventh resistor element 44 and one node of the first capacitor 45. The other node of the seventh resistor element 44 and the other node of the first capacitor 45 are connected to the ground.

The base node of the separation transistor 35 comes to have a predetermined potential. In a steady state where no current flows through the DC removing capacitor 31, a potential of the other node of the DC removing capacitor 31 is substantially equal to the potential of the base node of the separation transistor 35.

The current passage from the DC removing capacitor 31 to the base node of the amplifier transistor 41 causes an increase in currents of the base node and the collector node of the amplifier transistor 41 and a decrease in a terminal potential of an amplifier transistor 41 side of the fifth resistor element 42. This causes the current passage from a separation transistor 35 side to an amplifier transistor 41 side in the eighth resistor element 46. The current flowing through the eighth resistor element 46 is larger than the current flowing from the DC removing capacitor 31 to the base node of the amplifier transistor 41.

The current passage through the eighth resistor element 46 from the separation transistor 35 side to the amplifier transistor 41 side causes a decrease in the current of the base node of the separation transistor 35 and also a decrease in the current of the collector node of the separation transistor 35. The voltage generated in the separation resistor element 36 becomes lower.

That is, when the current flows from the DC removing capacitor 31 to the base node of the separation transistor 35, the current amplified by the amplifier transistor 41 flows through the eighth resistor element 46 from the separation transistor 35 side to the amplifier transistor 41 side. The current of the collector node of the separation transistor 35 decreases. The voltage generated in the separation resistor element 36 becomes lower. A voltage of the collector node of the separation transistor 35 increases.

On the contrary, the current passage from the base node of the amplifier transistor 41 to the DC removing capacitor 31 causes a decrease in the current of the base node of the amplifier transistor 41 and also a decrease in the current of the collector node thereof. A voltage of the fifth resistor element 42 becomes lower. A potential of the collector node of the amplifier transistor 41 increases. The terminal potential of the amplifier transistor 41 side of the fifth resistor element 42 increases. A current flows in the eighth resistor element 46 from the amplifier transistor 41 side to the separation transistor 35 side.

The current passage through the eighth resistor element 46 from the amplifier transistor 41 side to the separation resistor 35 side causes an increase in the current of the base node of the separation transistor 35, However, the separation transistor 35 has been ON in the steady state. The voltage of the collector node thereof has already become 0 V. Therefore, even if the current of the collector node of the separation circuit 35 increases, the voltage of the collector node remains 0 V and does not change.

As described above, the voltage generated in the collector node of the separation transistor 35 increases from the steady state voltage 0 V when the current flows from the DC removing capacitor 31 to the base node of the amplifier transistor 41. A finite voltage is generated in the collector node. On the contrary, when the current flows from the base node of the amplifier transistor 41 to the DC removing capacitor 31, the voltage of the collector node is kept 0 V being the steady-state voltage.

The low pass filter circuit 37 to which the separation resistor element 36 is connected has a filter diode 51, a filter capacitor 52, and a filter resistor element 53. An anode node of the filter diode 51 is connected to the collector node of the separation transistor 35 and the one node of the separation resistor element 36. A cathode node of the filter diode 51 is connected to one node of the filter capacitor 52 and one node of the filter resistor element 53. The other node of the filter capacitor 52 and the other node of the filter resistor element 53 are connected to the ground.

The output circuit 38 has an output transistor 61, an output resistor element 62, a ninth resistor element 63, and a tenth resistor element 64. The output transistor 61 is an NPN transistor. A collector node of the output transistor 61 is connected to one node of the output resistor element 62 and the input terminal 2 of the microcomputer 1. The other node of the output resistor element 62 is connected to the power source. An emitter node of the output transistor 61 is connected to the ground.

A base node of the output transistor 61 is connected to one node of the ninth resistor element 63 and one node of the tenth resistor element 64. The other node of the ninth resistor element 63 is connected to the cathode node of the filter diode 51. The other node of the tenth resistor element 64 is connected to the ground.

The increase in the potential of the collector node of the separation transistor 35 due to the decrease in the voltage generated in the separation resistor element 36 is followed by an increase in a potential of the cathode node of the filter diode 51. The decrease in the potential of the collector node of the separation transistor 35 due to the increase in the voltage generated in the separation resistor element 36 is followed by a decrease in the potential of the cathode node of the filter diode 51.

The filter capacitor 52 is connected between the cathode node of the filter diode 51 and the ground. The filter resistor element 53 is connected in parallel to the filter capacitor 52. The filter capacitor 52 and the filter resistor element 53 function as a low pass filter. A potential of the base node of the output transistor 61 presents a slow change that is a potential change of the anode node of the filter diode 51 from which a high-frequency component is removed.

The output transistor 61 turns on when a base node-emitter node voltage is a predetermined potential difference or more. When the output transistor 61 is ON, a voltage is generated in the output resistor element 62. A potential of the input terminal 2 of the microcomputer 1 lowers.

Next, a light emission operation and a light reception operation of the electronic device according to the embodiment 1 as configured above will be described, taking a case of full-duplex data communication as an example.

Figure 2:
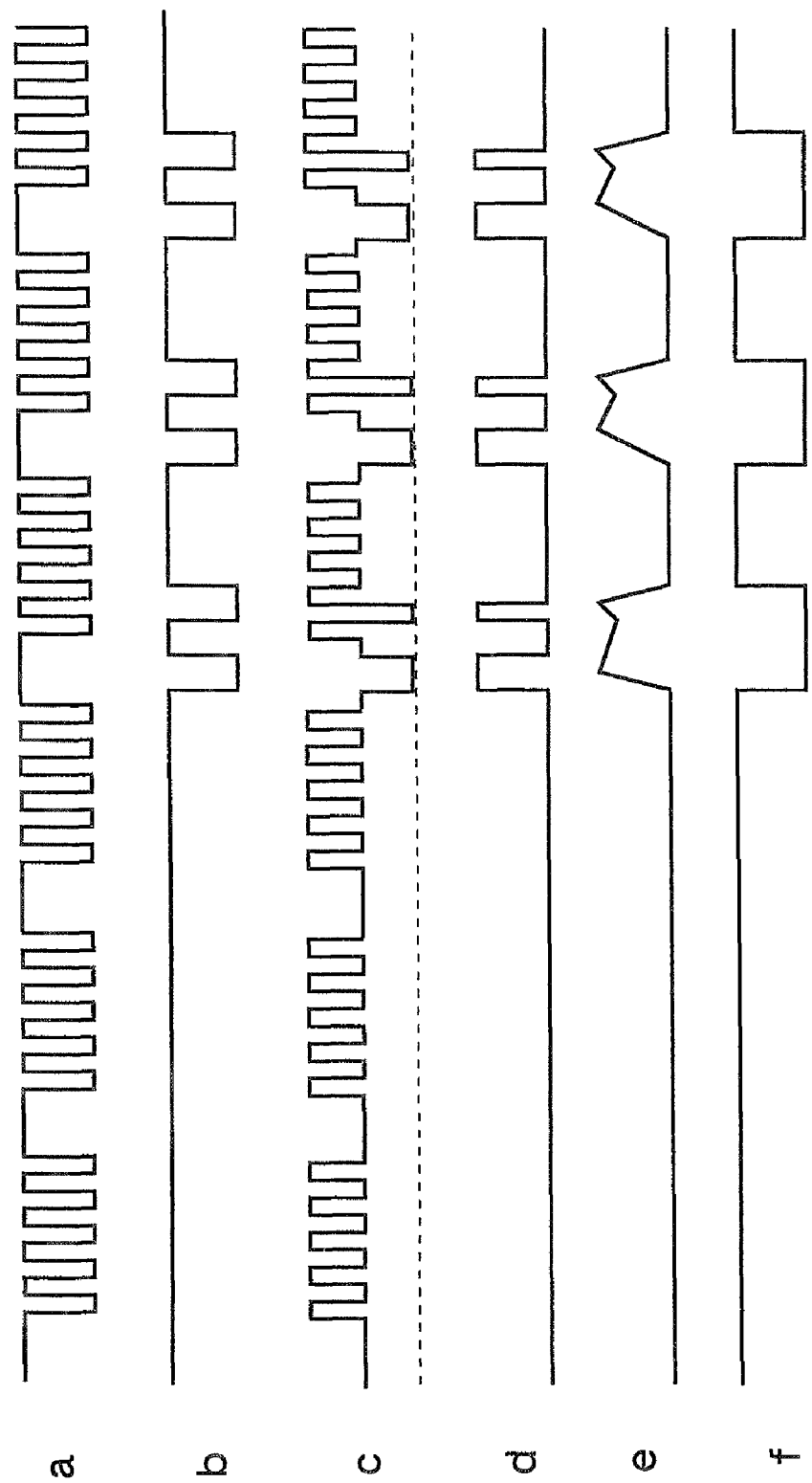
FIG. 2 is a timing chart showing signal waveforms in a full-duplex data communication operation of the electronic device in FIG. 1.

FIG. 2 is a timing chart showing an example of signal waveforms in the full-duplex data communication operation of the electronic device in FIG. 1. A waveform "a" is a waveform of a potential of the output terminal 3 of the microcomputer 1, a waveform "b" is a waveform of a light emission signal that is outputted from another electronic device being a communication partner to be incident on the light-emitting diode 11. A waveform "c" is a voltage waveform of the collector node of the amplifier transistor 41. A waveform "d" is a voltage waveform of the collector node of the separation transistor 35. A waveform "e" is a voltage waveform of the one node of the ninth resistor element 63. A waveform "f" is a voltage waveform of the input terminal 2 of the microcomputer 1.

To make the light-emitting diode 11 emit light based on transmission data, the transmission control part 5 realized in the microcomputer 1 outputs a pulse train from the output terminal 3 for every one transmission data, the pulse train consisting of a plurality of pulses modulated at, for example, 38 kHz. The potential of the output terminal 3 of the microcomputer 1 changes as shown by the waveform "a" in FIG. 2. The length of the whole pulse train may be about 600 microseconds. Such specifications achieve communication at the same level of speed as that of infrared communication between an electronic device and its remote controller unit.

When the output terminal 3 of the microcomputer 1 changes from high level (for example, the power supply potential) to low level (for example, the ground potential) according to each pulse in the pulse train, an operation state of the PNP transistor 21 changes from an OFF state to an ON state, so that the light-emitting diode 11 is lighted by the current of the collector node of the PNP transistor 21. A forward bias based on the transmission data is intermittently applied to the light-emitting diode 11.

When the output terminal 3 of the microcomputer 1 changes from low level (for example, the ground potential) to high level (for example, the power supply potential), the operation state of the PNP transistor 21 changes from the ON state to the OFF state, so that the light-emitting diode 11 is extinguished.

Thus, the electronic device blinks the light-emitting diode 11 by pulse driving based on the transmission data. By blinking the light-emitting diode 11 by the pulse driving, the electronic device wirelessly transmits a transmission signal based on the transmission data to another electronic device. The electronic device causes the light-emitting diode 11 to intermittently emit light for each transmission data.

As shown by the waveform "b" in FIG. 2, when an optical signal generated by pulse driving is incident on the light-emitting diode 11 from another electronic device, holes and electrons are separately generated in the vicinity of the PN junction part of the light-emitting diode 11, so that the holes and the electrons are accumulated in the anode node side and the cathode node side respectively. When the circuit is connected to the light-emitting diode 11 in this state, a current flows from the anode node side. Incidentally, in the waveform "b" in FIG. 2, the frequency of the optical signal is different from 38 kHz, and is, for example, 19 kHz.

The current outputted by the light-emitting diode 11 flows toward the base node of the amplifier transistor 41 via the DC removing capacitor 31. This current is amplified by the amplifier transistor 41. The amplified current flows from the separation transistor 35 toward the amplifier transistor 41 to flow through the eighth resistor element 46. The current of the collector node of the separation transistor 35 decreases. The voltage generated in the separation resistor element 36 greatly decreases. The voltage of the collector node of the separation transistor 35 becomes higher.

Therefore, the increase in the potential of the collector node of the separation transistor 35 is followed by the increase in the potential of the base node of the output transistor 61, so that the state of the output transistor 61 changes from the OFF state to the ON state. A voltage is generated in the output resistor element 62 and the potential of the input terminal 2 of the microcomputer 1 is lowered.

As shown by the waveform "b" in FIG. 2, when no optical signal is incident on the light-emitting diode 11, no current flows between the light-emitting diode 11 and the base node of the amplifier transistor 41. The amplifier transistor 41 and the separation transistor 35 return to the steady state. A voltage is generated in the separation resistor element 36 due to the current of the collector node of the separation transistor 35 in the ON state. The potential of the collector node of the separation transistor 35 returns to the steady state.

Therefore, the potential of the base node of the output transistor 61 lowers to the potential of the collector node of the separation transistor 35 in this steady state. The operation state of the output transistor 61 changes from the ON state to the OFF state, so that no voltage is generated in the output resistor element 62. The potential of the input terminal 2 of the microcomputer 1 becomes higher.

The reception control part 6 of the microcomputer 1 obtains from the input/output port 4 a digital value according to the potential level of the input terminal 2. Consequently, the reception control part 6 can wirelessly receive data transmitted by means of the optical signal from the other electronic device.

Incidentally, if an optical signal based on a pulse train is incident on the light-emitting diode 11 while the transmission control part 5 is pulse-driving the output terminal 3, since 38 kHz and 19 kHz are separately used, there occurs a state, as shown in FIG. 2, such that the light reception signal overlaps with a period in which the transmission control part 5 does not control the output terminal 3 to low level, between two adjacent periods in which the transmission control part 5 controls the output terminal 3 to low level.

If the optical signal is incident on the light-emitting diode 11 in this non-control period and this overlapping state occurs, a current according to the optical signal flows through the light-emitting diode 11. The voltage of the separation resistor element 36 decreases due to the input of the optical signal. The output transistor 61 turns on. A voltage is generated in the output resistor element 62.

The current flowing through the light-emitting diode 11 is amplified by the amplifier transistor 41. The voltage of the separation resistor element 36 changes according to the amplified current. The low pass filter circuit 37 is disposed between the separation resistor element 36 and the output transistor 61. Therefore, if an optical signal is incident on the light-emitting diode 11 in the non-control period in the course of the pulse driving of the output terminal 3 by the transmission control part 5, the voltage of the output resistor element 62 digitally changes as it changes in the period where the transmission control part 5 is not pulse-driving the output terminal 3.

As a result, the reception control part 6 is capable of wirelessly receiving data based on the optical signal from the other electronic device, in the period in which the transmission control part 5 is controlling the light-emitting diode 11 to blink based on communication data. The electronic device is capable of full-duplex data communication with the other electronic device. The electronic device is also capable of half-duplex data communication.

In the embodiment 1, as shown in FIG. 2, the frequency used when the transmission control part 5 controls the light-emitting diode 11 to blink is 38 kHz, and the frequency of an optical signal received from the other electronic device is 19 Hz. Thus using the different frequencies for the optical signals in two mutually communicating electronic devices can provide the following effects.

Specifically, when the transmission control part 5 changes the level of the output terminal 3 between high level and low level by the pulse driving, the potential of the anode node of the light-emitting diode 11 is varied by this control. As a result, as shown by the waveform "c" in FIG. 2, the potential of the collector node of the amplifier transistor 41 changes between the steady state level and a voltage level higher than the steady state level. As shown by the waveform "d" in FIG. 2, this potential change of the collector node of the amplifier transistor 41 causes little change in the voltage generated in the separation resistor element 36, but during the light emission period of the light-emitting diode 11, the voltage generated in the separation resistor element 36 does not change to the level according to the optical signal received by the light-emitting diode 11.

For example, in a case where pulse periods in two mutually communicating electronic devices match each other, if their phases completely match each other, the voltage of the separation resistor element 36 does not change according to an optical signal received from the other electronic device even though the light-emitting diode 11 is in a state of receiving the optical signal from the other electronic device. That is, no voltage change of the separation resistor element 36 based on the received optical signal can be obtained.

On the other hand, as in the embodiment 1, by making the frequencies of the optical signals in two mutually communicating electronic devices different from each other, it is possible to surely obtain the voltage change of the separation resistor element 36 based on the optical signal received from the other electronic device while the light-emitting diode 11 is receiving the optical signal from the other electronic device, as shown in FIG. 2.

Further, the current flowing through the light-emitting diode 11 is amplified by the amplifier transistor 41 as described above. The voltage of the separation resistor element 36 changes according to the amplified current. The low pass filter circuit 37 is disposed between the separation resistor element 36 and the output transistor 61. Therefore, even in a state where the period of the light emission of the light-emitting diode 11 coincides with the period in which the optical signal is incident on the light-emitting diode 11 and as a result, as shown in the waveform "d" in FIG. 2, the voltage change of the separation resistor element 36 based on the received optical signal cannot be partly obtained, a voltage waveform substantially the same as that in a state without any such loss can be outputted as the output voltage of the output resistor element 62 when the light-emitting diode 11 receives the optical signal from the other electronic device.

Incidentally, if the pulse frequency of one of the two mutually communicating electronic devices is defined as 1, the pulse frequency of the other is preferably set 0.5 to 1.5 times to the pulse frequency of the one electronic device, more preferably 0.75 to 1.25 times.

In this embodiment 1, the parallel capacitor 12 is connected in parallel to the light-emitting diode 11. For a short time after the voltage applied to the light-emitting diode 11 is changed from a forward direction to a reverse direction, a current flows through the light-emitting diode 11 due to the effect of accumulated minority carriers. This current flows from the cathode node to the anode node in the light-emitting diode 11.

Without the parallel capacitor 12, the current flowing through the light-emitting diode 11 due to the effect of the accumulated minority carriers would flow toward the base node side of the amplifier transistor 41 via the DC removing capacitor 31. As a result, the voltage generated in the separation resistor element 36 would decrease as in a case where the current based on the optical signal flows through the light-emitting diode 11. Even when the light-emitting diode 11 is receiving no optical signal, the voltage generated in the separation resistor element 36 would change in the same manner as when the light-emitting diode 11 receives an optical signal.

On the other hand, by connecting the parallel capacitor 12 in parallel to the light-emitting diode 11, the short-time current flowing through the light-emitting diode 11 due to the effect of the accumulated minority carriers flows in a loop composed of the light-emitting diode 11 and the parallel capacitor 12. As a result, it is possible to prevent the occurrence of the state in which the voltage generated in the separation resistor element 36 changes when the light-emitting diode 11 is not receiving an optical signal, as it changes when the light-emitting diode 11 receives an optical signal.

As described above, in the embodiment 1, it is possible to cause the single light-emitting diode 11 to emit light based on transmission data and receive data based on an optical signal incident on the light-emitting diode 11. In the embodiment 1, the single light-emitting diode 11 can have the plural functions of data transmission and data reception, which can realize device downsizing. The electronic device of the embodiment 1 is capable of full-duplex data communication and half-duplex data communication.

In a case of the half-duplex data communication, the period of the light emission of the light-emitting diode 11 based on transmission data does not overlap with the period in which an optical signal based on reception data is incident on the light-emitting diode 11. Therefore, the electronic device can have a more simplified configuration compared with the configuration of the embodiment 1, for example, the separation circuit 14 may be configured only by the DC removing capacitor 31, the third resistor element 33, the fourth resistor element 34, and the separation transistor 35, or may be configured without the low pass filter circuit 37.

Embodiment 2

Figure 3:
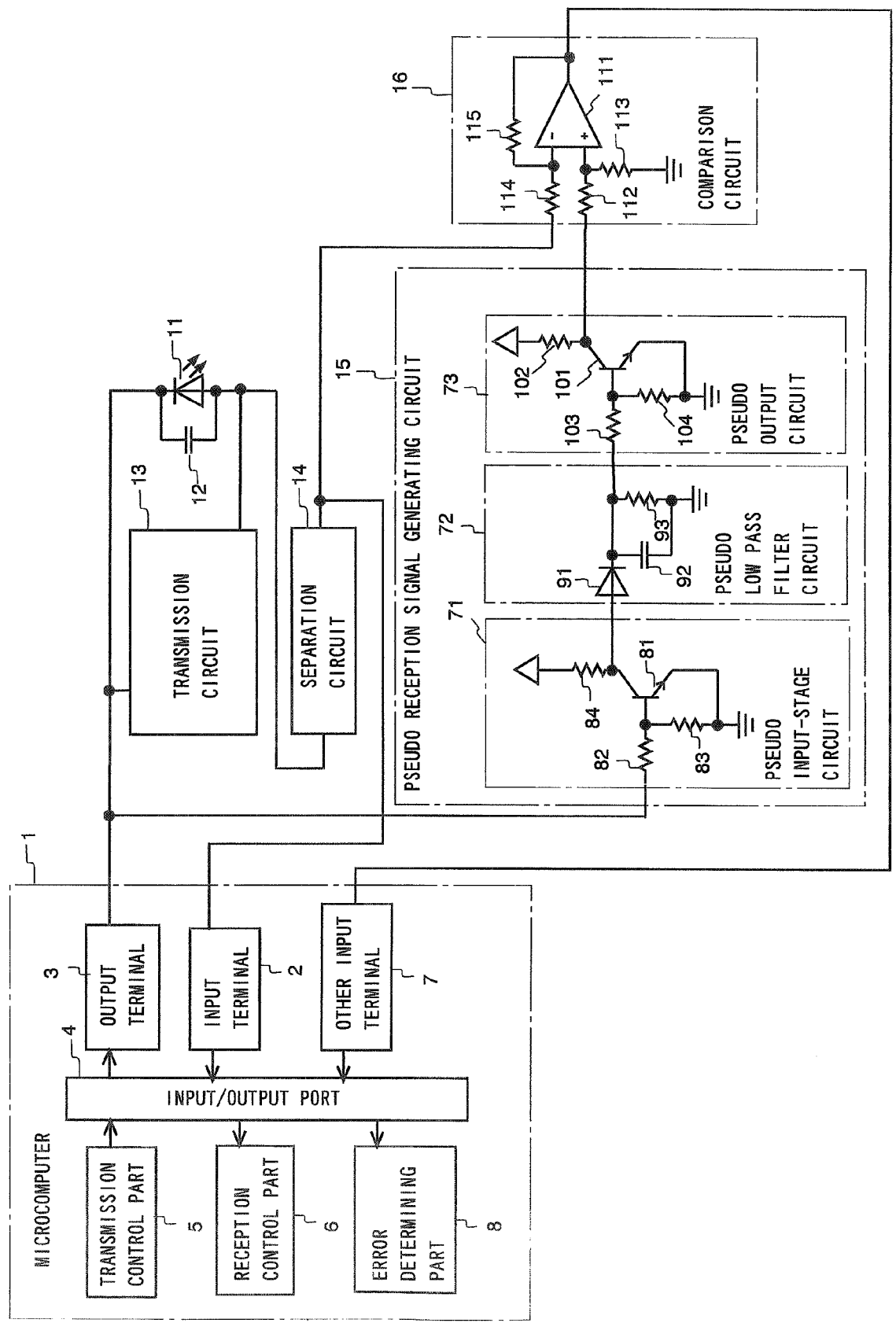
FIG. 3 is a block diagram showing an electronic device using a light-emitting diode for data communication, according to an embodiment 2 of the present invention.

FIG. 3 is a block diagram showing an electronic device using a light-emitting diode for data transmission/reception according to the embodiment 2 of the present invention. The electronic device according to the embodiment 2 has a function of determining whether or not transmission data is correctly transmitted.

A microcomputer 1 has other input terminal 7 in addition to an input terminal 2 and an output terminal 3. In the microcomputer 1, an error determining part 8 is realized in addition to a transmission control part 5 and a reception control part 6.

The electronic device has a pseudo reception signal generating circuit 15 and a comparison circuit 16.

The pseudo reception signal generating circuit 15 has a pseudo input-stage circuit 71, a pseudo low pass filter circuit 72, and a pseudo output circuit 73.

The pseudo input-stage circuit 71 has an input-stage transistor 81, an eleventh resistor element 82, a twelfth resistor element 83, and an input-stage resistor element 84. The input-stage transistor 81 is an NPN transistor. A base node of the input-stage transistor 81 is connected to one node of the eleventh resistor element 82 and one node of the twelfth resistor element 83. The other node of the eleventh resistor element 82 is connected to the output terminal 3 of the microcomputer 1. The other node of the twelfth resistor element 83 as well as an emitter node of the input-stage transistor 81 is connected to a ground. A collector node of the input-stage transistor 81 is connected to one node of the input-stage resistor element 84. The other node of the input-stage resistor element 84 is connected to a power source.

The pseudo low pass filter circuit 72 has a pseudo filter diode 91, a pseudo filter capacitor 92, and a pseudo filter resistor element 93. An anode node of the pseudo filter diode 91 is connected to the collector node of the input-stage transistor 81. A cathode node of the pseudo filter diode 91 is connected to one node of the pseudo filter capacitor 92 and one node of the pseudo filter resistor element 93. The other node of the pseudo filter capacitor 92 and the other node of the pseudo filter resistor element 93 are connected to the ground.

The pseudo output circuit 73 has a pseudo output transistor 101, a pseudo output resistor element 102, a thirteenth resistor element 103, and a fourteenth resistor element 104. The pseudo output transistor 101 is an NPN transistor. A collector node of the pseudo output transistor 101 is connected to one node of the pseudo output resistor element 102. The other node of the pseudo output resistor element 102 is connected to the power source. An emitter node of the pseudo output transistor 101 is connected to the ground.

A base node of the pseudo output transistor 101 is connected to one node of the thirteenth resistor element 103 and one node of the fourteenth resistor element 104. The other node of the thirteenth resistor element 103 is connected to the cathode node of the pseudo filter diode 91. The other node of the fourteenth resistor element 104 is connected to the ground.

The comparison circuit 16 has a differential operational amplifier 111, a fifteenth resistor element 112, a sixteenth resistor element 113, a seventeenth resistor element 114, and an eighteenth resistor element 115.

A noninverting input terminal of the differential operational amplifier 111 is connected to one node of the fifteenth resistor element 112 and one node of the sixteenth resistor element 113. The other node of the fifteenth resistor element 112 is connected to the collector node of the pseudo output transistor 101. The other node of the sixteenth resistor element 113 is connected to the ground.

An inverting input terminal of the differential operational amplifier 111 is connected to one node of the seventeenth resistor element 114 and one node of the eighteenth resistor element 115. The other node of the seventeenth resistor element 114 is connected to an emitter node of an output transistor 61. The other node of the eighteenth resistor element 115 is connected to an output node of the differential operational amplifier 111. The output node of the differential operational amplifier 111 is connected to the other input terminal 7 of the microcomputer 1.

The error determining part 8 obtains a digital value that is outputted from an input/output port 4 according to an input voltage level of the other input terminal 7. The error determining part 8 determines the existence or not of an error based on the digital value.

Constituent elements other than those described above have the same functions as those of the constituent elements with the same names in the embodiment 1 and are denoted by the same reference numerals as those of the embodiment 1, and description thereof will be omitted.

Next, the operation of the electronic device according to the embodiment 2 as configured above will be described.

Figure 4:
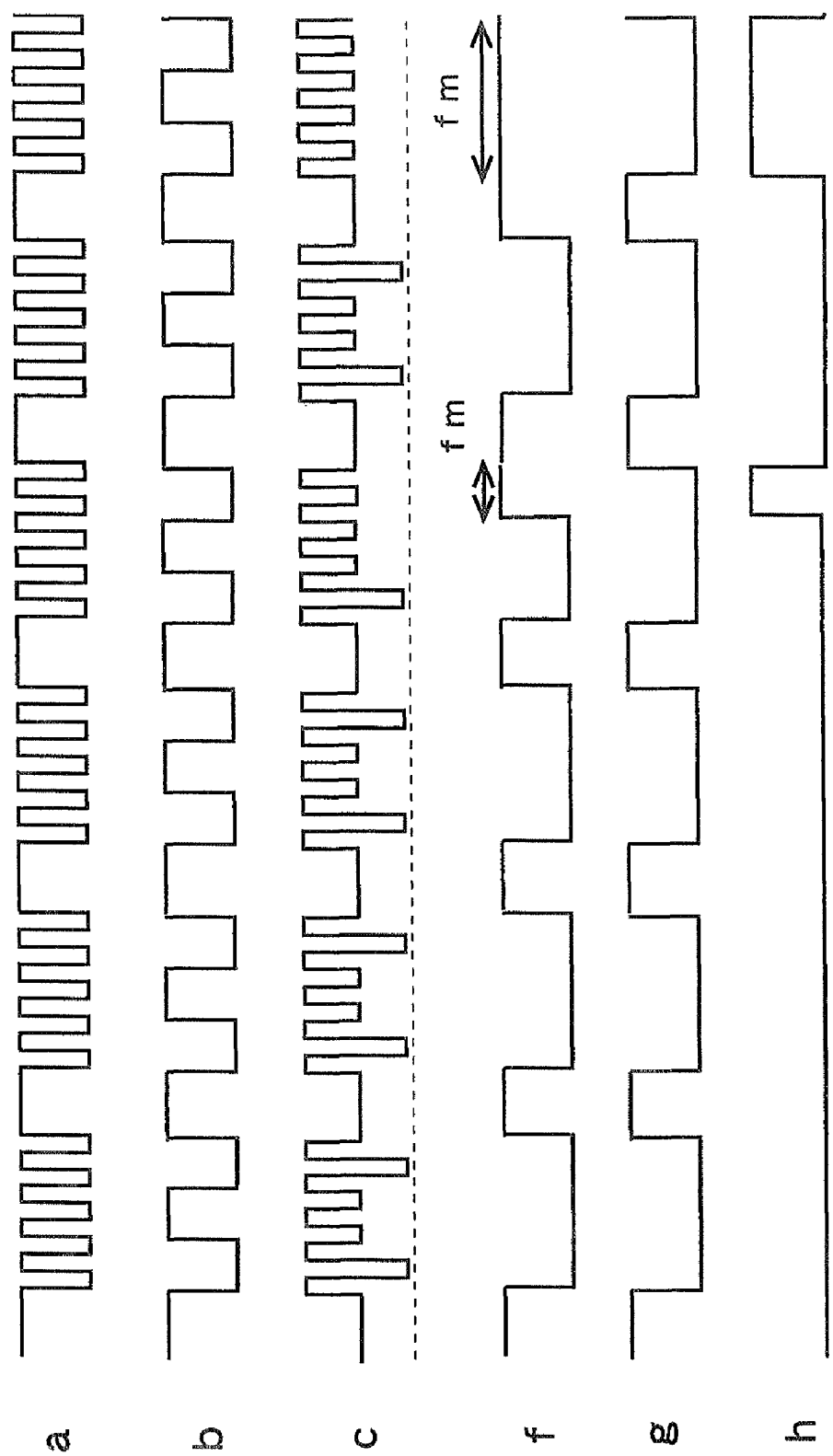
FIG. 4 is a timing chart showing part of signal waveforms in a full-duplex data communication operation of the electronic device in FIG. 3.

FIG. 4 is a timing chart showing an example of part of signal waveforms in a full-duplex data communication operation of the electronic device in FIG. 3. A waveform "a" is a waveform of a potential of the output terminal 3 of the microcomputer 1. A waveform "b" is a light emission signal waveform of an optical signal incident on the light-emitting diode 11, the optical signal being a signal by which data transmitted by this electronic device and received by another electronic device is returned from the other electronic device. A waveform "c" is a waveform of a potential of a collector node of an amplifier transistor 41, the waveform including an error. A waveform "f" is a voltage waveform of the input terminal 2 of the microcomputer 1. A waveform "g" is an output voltage waveform of the pseudo reception signal generating circuit 15. A waveform "h" is an output voltage waveform of the differential operational amplifier 111.

When the transmission control part 5 realized in the microcomputer 1 outputs from the output terminal 3 a pulse train consisting of a plurality of pulses modulated at, for example, 38 kHz, the light-emitting diode 11 blinks in response to the pulse train.

Further, the input-stage transistor 81 of the pseudo reception signal generating circuit 15 turns on when the output terminal 3 of the microcomputer 1 has high level, and turns off when the output terminal 3 has low level. Based on the switching between the ON state and the OFF state of the input-stage transistor 81, a potential of the anode node of the pseudo filter diode 91 changes between high level and low level.

Between the cathode node of the pseudo filter diode 91 and the pseudo output circuit 73, a low pass filter is connected. This low pass filter is composed of the pseudo filter capacitor 92 and the pseudo filter resistor element 93. A potential change of the base node of the pseudo output transistor 101 is the potential change of the anode node of the pseudo filter diode 91 from which a high frequency is removed.

When the pseudo filter diode 91 changes between the ON state and the OFF state due to the potential change of its base node, the voltage outputted from the pseudo reception signal generating circuit 15 changes as shown by the waveform "g" in FIG. 4.

The output voltage of the pseudo reception signal generating circuit 15 and an output voltage of an output circuit 38 are inputted as two differential inputs to the differential operational amplifier 111. Using the output voltage of the pseudo reception signal generating circuit 15 as a reference, the differential operational amplifier 111 controls its output voltage to high level when a difference between the output voltage of the output circuit 38 and the reference voltage becomes large. The other input terminal 7 of the microcomputer 1 is connected to the output terminal of this differential operational amplifier 111.

As shown in the fourth data waveform (waveform "f") in FIG. 4, when the waveform "f" of the voltage that is outputted from the output circuit 38 based on the optical signal by which the other electronic device returns the received data changes to a waveform form "fm" including an error and thus being different from the original waveform (the same waveform as the waveform "g"), the output of the differential operational amplifier 111 changes from low level to high level. As shown in the sixth data waveform "h" in FIG. 4, the output of the differential operational amplifier 111 changes to high level.

The output of the differential operational amplifier 111 is inputted to the other input terminal 7 of the microcomputer 1. The input/output port 4 outputs a digital value according to an input voltage inputted to the other input terminal 7. The error determining part 8 obtains the digital value based on the voltage of the other input terminal 7 to determine the existence or not of an error.

As described above, according to the embodiment 2, the other electronic device receiving an optical signal that is outputted from the light-emitting diode under the control by the transmission circuit 13 returns an optical signal based on reception data thereof, so that, while transmitting data, the electronic device transmitting the data is capable of determining, based on the output of the differential operational amplifier 111, whether or not the data is correctly transmitted to the other electronic device. For each transmission data, the electronic device can determine in real-time whether or not all the transmission data have been correctly received by the other electronic device being a communication partner. The electronic device is capable of accurately verifying a communication state. The electronic device is capable of giving reliability to data it transmits.

Incidentally, in the above-described embodiment 2, phases of the waveform 'f' and the waveform "g" in FIG. 4 coincide with each other. Actually, however, it takes time for data to be forwarded and returned between electronic devices. Therefore, in the configuration in FIG. 3, the waveform "f" is delayed in phase from the waveform "g". As a countermeasure, for example, a delay element causing a delay time corresponding to the delay time of the waveform "f" is disposed between the output terminal 3 of the microcomputer 1 and the noninverting input terminal of the differential operational amplifier 111. Another possible example of the countermeasure in addition to the disposition of the delay element is that the error determining part 8 operating in the microcomputer 1 determines that an error exists when confirming that the output level of the differential operational amplifier 111 changes to high level a predetermined plural consecutive number of times. Alternatively, the error determining part 8 may determine that an error exists when sampling data of the output of the differential amplifier 111 becomes high level the consecutive number of times that is different from the consecutive number of times so far.

Further, in the above-described embodiments 1 and 2, a light-emitting diode emitting infrared rays is used as the light-emitting diode 11. Another example usable as the light-emitting diode 11 is a light-emitting diode emitting visible light of red or the like. In a case where the visible light-emitting diode is used, the light-emitting diode 11 may serve not only the aforesaid two functions of data transmission and data reception but also a function of displaying a power supply state or the like of the device or a function of radiating AF (Auto Focus) auxiliary light of a camera. Further, light-emitting diodes used in flashlights or the like include those having a characteristic of diffusing light that they emit. The use of a light-emitting diode having such a characteristic of diffusing emitted light eliminates a need to have two mutually communicating devices face each other with a predetermined positional relation. This enables high flexibility in mutual positional relation of the two mutually communicating electronic devices during their communication, and enables one electronic device to simultaneously transmit data to two or more other electronic devices.

Especially, nearly all electronic devices use at least one visible light-emitting diode. Utilizing this existing visible light-emitting diode for communication makes it possible for the electronic device to additionally have an optical communication function at low cost without any increase in an area occupied by the light-emitting diode in a surface of the electronic device. Further, it becomes possible to construct a communication system by a plurality of electronic devices having the data transmission function and the data reception function.

Embodiment 3

Figure 5:
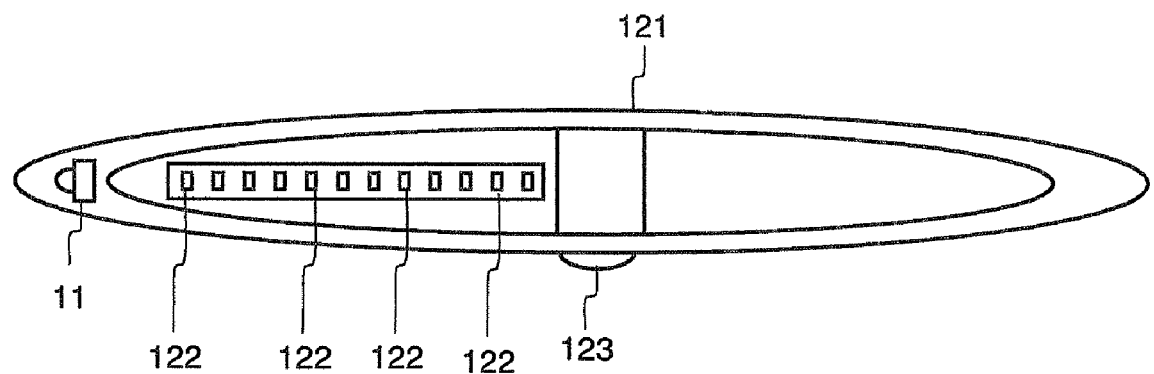
FIG. 5 is a front view of a swing-type aerial display device using a light-emitting diode for data communication, which is a kind of electronic device according to an embodiment 3 of the present invention.
Figure 6:
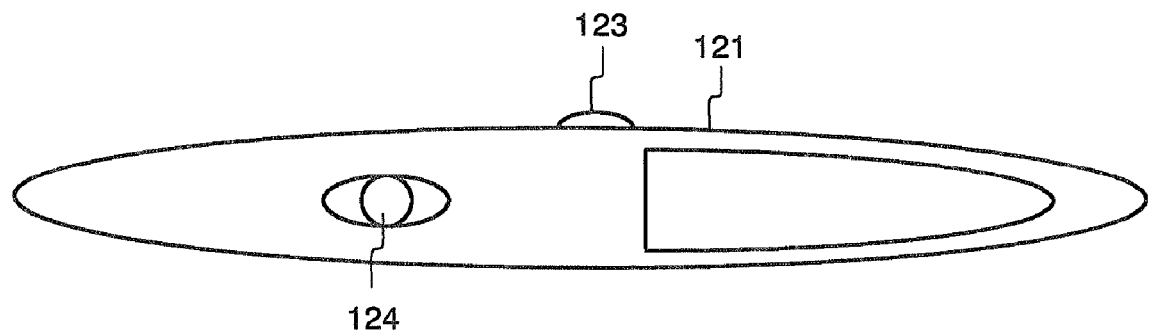
FIG. 6 is a rear view of the swing-type aerial display device in FIG. 5.
Figure 7:
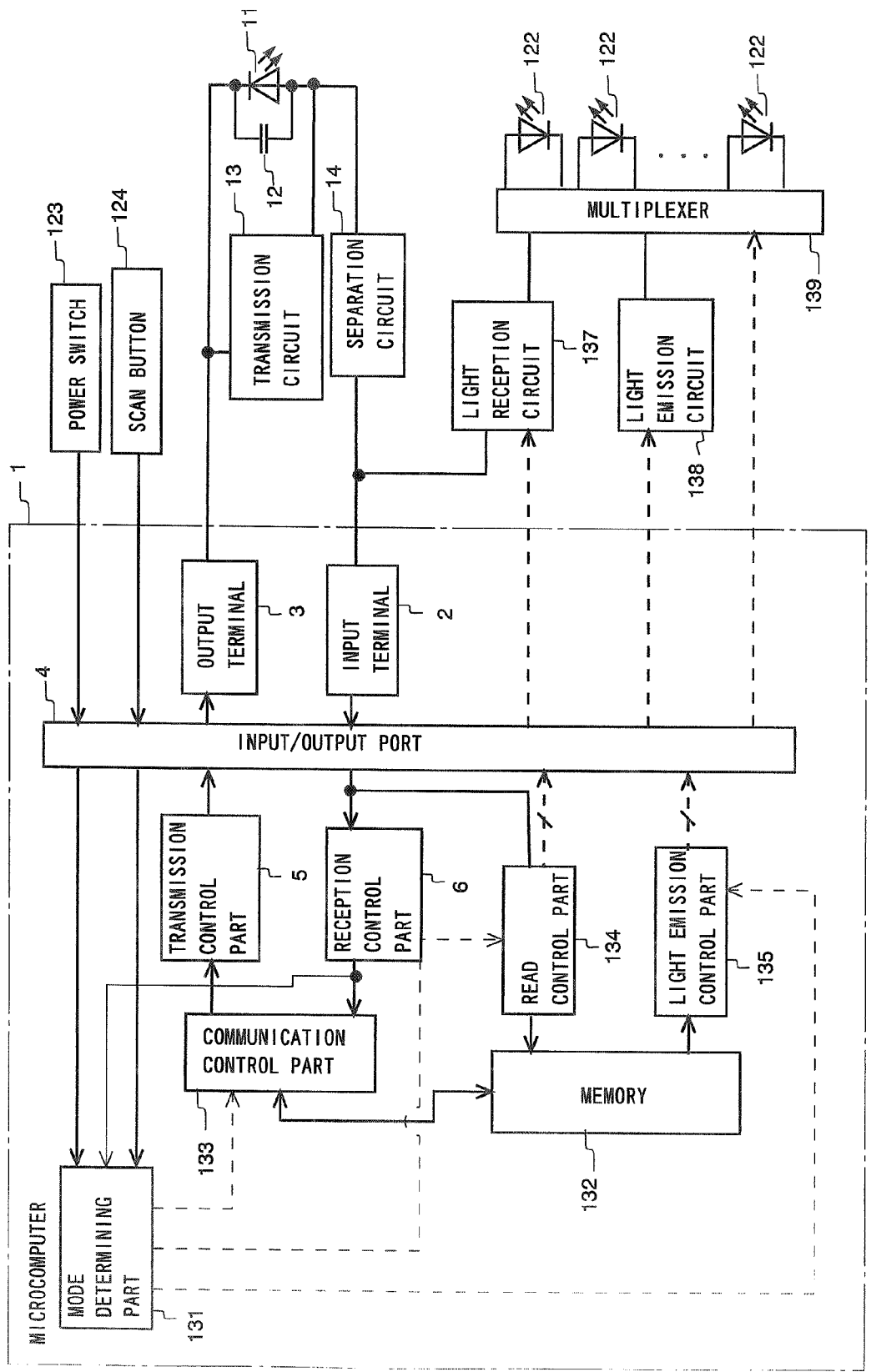
FIG. 7 is a block diagram of an electronic circuit installed in the swing-type aerial display device.

FIG. 5 is a front view of a swing-type aerial display device which is a kind of an electronic device according to the embodiment 3 of the present invention. FIG. 6 is a rear view of the swing-type aerial display device in FIG. 5. FIG. 7 is a block diagram of an electronic circuit installed in the swing-type aerial display device. The swing-type aerial display device is a kind of a residual image forming tool and uses light-emitting diodes for data transmission/reception.

A casing 121 of the swing-type aerial display device has a substantially stick shape. A light-emitting diode 11 is disposed on a longitudinal end portion of the casing 121. Further, a plurality of display LEDs (Light-Emitting Diodes) 122 are disposed in line on a side face along the longitudinal direction of the casing 121. The display LEDs 122 emit, for example, red light. A power switch 123 and a scan button 124 are further disposed on the casing 121 of the swing-type aerial display device.

The power switch 123 is a 3-contact slide switch that changes among three states of power OFF, display mode power ON, and scan mode power ON.

The scan button 124 is a button switch whose contact is closed when the scan button 124 is pressed.

Inside the casing 121 of the swing-type aerial display device, the electronic circuit shown in FIG. 7 is installed. The electronic circuit has a microcomputer 1. In the microcomputer 1, a mode determining part 131, a memory 132, a communication control part 133, a read control part 134, a light emission control part 135, and so on are realized in addition to a transmission control part 5 and a reception control part 6. The microcomputer 1 is connected to the power switch 123, the scan button 124, a transmission circuit 13, the light-emitting diode 11, a parallel capacitor 12, a separation circuit 14, a light reception circuit 137, a light emission circuit 138, a multiplexer 139, and so on.

The transmission circuit 13, the light-emitting diode 11, the parallel capacitor 12, the separation circuit 14, the transmission control part 5, and the reception control part 6 have the same functions as those of the constituent elements with the same names in the embodiment 1 and denoted by the same reference numerals as those of the first embodiment 1, and description thereof will be omitted.

The memory 132 stores image data used for controlling the light emission of the plural display LEDs 122.

The communication control part 133 manages the operations of the transmission control part 5 and the reception control part 6. The communication control part 133 causes the transmission control part 5 to transmit image data stored in the memory 132. The communication control part 133 stores data received by the reception control part 6, as image data in the memory 132.

The multiplexer 139 is connected to the plural display LEDs 122. The multiplexer 139 selects each of the display LEDs 122 individually based on a selection signal from the microcomputer 1. The multiplexer 139 selects a display LED or display LEDs for light emission, or a display LED or display LEDs for light reception from the display LEDs 122, based on the selection signal from the microcomputer 1.

The light emission circuit 138 applies a forward bias to the display LED 122 which is selected for light emission by the multiplexer 139. Consequently, the light-emitting LED 122 selected for light emission by the multiplexer 139 emits light.

The light reception circuit 137 outputs a digital value according to an amount of light received by the display LED 122 which is selected for light reception by the multiplexer 139.

The read control part 134 controls the light emission circuit 138, the light reception circuit 137, and the multiplexer 139 via an input/output port 4. The read control part 134 reads an image by using the plural display LEDs 122. The read control part 134 stores image data of the read image in the memory 132.

The light emission control part 135 controls the light emission circuit 138, the light reception circuit 137, and the multiplexer 139 via the input/output port 4. Based on the image data stored in the memory 132, the light emission control part 135 controls the light emission of each of the display LEDs 122 individually in synchronization with a waving movement of the swing-type aerial display device.

The mode determining part 131 determines an operation mode of the swing-type aerial display device based on the operations of the power switch 123 and the scan button 124. The operation modes of the swing-type aerial display device include a light emission mode, a read mode, a transmission mode, and a reception mode.

The read mode is a mode in which image data is read by using the plural display LEDs 122.

The light emission mode is a mode in which the plural display LEDs 122 are caused to emit light based on the image data stored in the memory 132, in synchronization with the waving movement of the swing-type aerial display device.

The transmission mode is a mode in which the image data stored in the memory 132 is transmitted from the light-emitting diode 11.

The reception mode is a mode in which image data based on an optical signal received by the light-emitting diode 11 is stored in the memory 132.

Next, the operation of the swing-type aerial display device according to the embodiment 3 as configured above will be described. In the following description of the operation, the read mode, the light emission mode, the transmission mode, and the reception mode are described in this order.

For example, the mode determining part 131 determines that the operation mode is the read mode when the power switch 123 is set to the scan mode power ON and in this state, the scan button 124 is pressed for continuous three seconds or longer. The mode determining part 131 instructs the read control part 134 to perform a read process. The read control part 134 starts the read process of an image.

To make the swing-type aerial display device read an image, a user puts the swing-type aerial display device on a character (picture) that is written on, for example, white paper with a black pen. The swing-type aerial display device is put thereon with the plural display LEDs 122 facing a paper side (in a direction so that they face the character or the picture).

The read control part 134 outputs to the multiplexer 139 a selection signal for lighting the display LED 122, for example, disposed closest to the light-emitting diode 11. The selected display LED 122 is lighted.

The read control part 134 outputs to the multiplexer 139 a selection signal for connecting the display LED 122 adjacent to the lighted display LED 122 to the light reception circuit 137. Light of the lighted display LED 122 is reflected on the paper. The adjacent display LED 122 receives this reflected light. The light reception circuit 137 outputs a digital value having a value according to the level of the light received by the adjacent display LED 122.

The read control part 134 reads the digital value outputted from the light reception circuit 137 to store the read digital value in the memory 132. After the storage is finished, the read control part 134 extinguishes the lighted display LED 122. Through the above-described processes, data corresponding to one pixel of image data is stored in the memory 132.

After the read of the data corresponding to the first one pixel is completed, the read control part 134 then connects the display LED 122 used for the previous read to the light emission circuit 138, and outputs to the multiplexer 139 a selection signal for connecting a further adjacent display LED 122 to the light reception circuit 137. Thereafter, the read control part 134 reads a digital value outputted from the light reception circuit 137 to store the read digital value in the memory 132. After this storage is finished, the read control part 134 extinguishes the lighted display LED 122. Consequently, data corresponding to two pixels of the image data are stored in the memory 132.

The read control part 134 executes the above-described control for all the display LEDs 122 one by one in sequence. Consequently, the image data corresponding to one line read by the plural display LEDs 122 are stored in the memory 132. The read control part 134 repeatedly executes the read process of the image data corresponding to one line. The swing-type aerial display device is moved by a user so as to scan the paper, so that the image data corresponding to the character picture) drawn on the white paper with the black pen are stored in the memory 132.

For example, when the power switch 123 is set to the display mode power ON, the mode determining part 131 determines that the operation mode is the light emission mode and instructs the light emission control part 135 to execute a light emission process.

When the swing-type aerial display device is started to be waved leftward or rightward, the light emission control part 135 reads the image data of the first line from the memory 132. The light emission control part 135 outputs to the multiplexer 139 a selection signal for selecting the display LED 122 that is to be connected to the light emission circuit 138, based on the image data of the first line. Consequently, the selected display LED 122 is lighted.

Further, the light emission control part 135 reads image data of the second line from the memory 132 in synchronization with the waving of the swing-type aerial display device. After reading the image data of the second line from the memory 132, the light emission control part 135 outputs to the multiplexer 139 a selection signal for selecting the display LED 122 that is to be connected to the light emission circuit 138, based on the read image data of the second line. The selected display LED 122 is lighted.

In synchronization with the waving of the swing-type aerial display device, the light emission control part 135 executes the read process of the image data corresponding to one line from the memory 132 and the process of outputting the selection signal to the multiplexer 139 line by line in sequence.

When the waving direction of the swing-type aerial display device is changed, the light emission control part 135 executes the process of reading, form the memory 132, image data corresponding to one line and the process of outputting a selection signal to the multiplexer 139 line by line in sequence in a reverse order of the previous processes.

Based on this light emission control, the plural display LEDs 122 of the swing-type aerial display device are lighted or extinguished in synchronization with the waving of the swing-type aerial display device. The plural display LEDs 122 are lighted or extinguished according to image data. In a space where the swing-type aerial display device is waved, a residual image based on the image data is formed by the blinking of the plural display LEDs 122.

For example, when the power switch 123 is set to the scan mode power ON and in this state, the scan button 124 is operated for less than 3 seconds, the mode determining part 131 determines that the operation mode is the transmission mode. The mode determining part 131 instructs the communication control part 133 to execute a transmission process of image data stored in the memory 132.

In the transmission mode, the communication control part 133 instructs the transmission control part 5 to transmit a transmission request signal. The transmission control part 5 causes the light-emitting diode 11 to intermittently emit light by pulse driving.

When receiving light of the light-emitting diode 11 based on the transmission request signal, another swing-type aerial display device being a transmission destination causes a light-emitting diode 11 of this other swing-type aerial display device to intermittently emit light by pulse driving. The reception control part 6 determines that the transmission is permitted based on the light emission of the light-emitting diode 11 of the other swing-type aerial display device, and notifies this to the communication control part 133. The communication control part 133 may discontinue the transmission process in a case where no transmission permission notification is given from the reception control part 6 for a predetermined period.

After the transmission is permitted, the communication control part 133 extinguishes the light-emitting diode 11 that has been intermittently lighted by the pulse driving for the transmission request. Thereafter, the communication control part 133 reads pixel data corresponding to the first one byte of the image data stored in the memory 132. The communication control part 133 supplies the transmission control part 5 with the read one-byte pixel data.

The transmission control part 5 causes the light-emitting diode 11 to emit light in a predetermined pattern according to a value of the supplied one-byte pixel data. The transmission control part 5 transmits the supplied one-byte pixel data.

Figure 8:
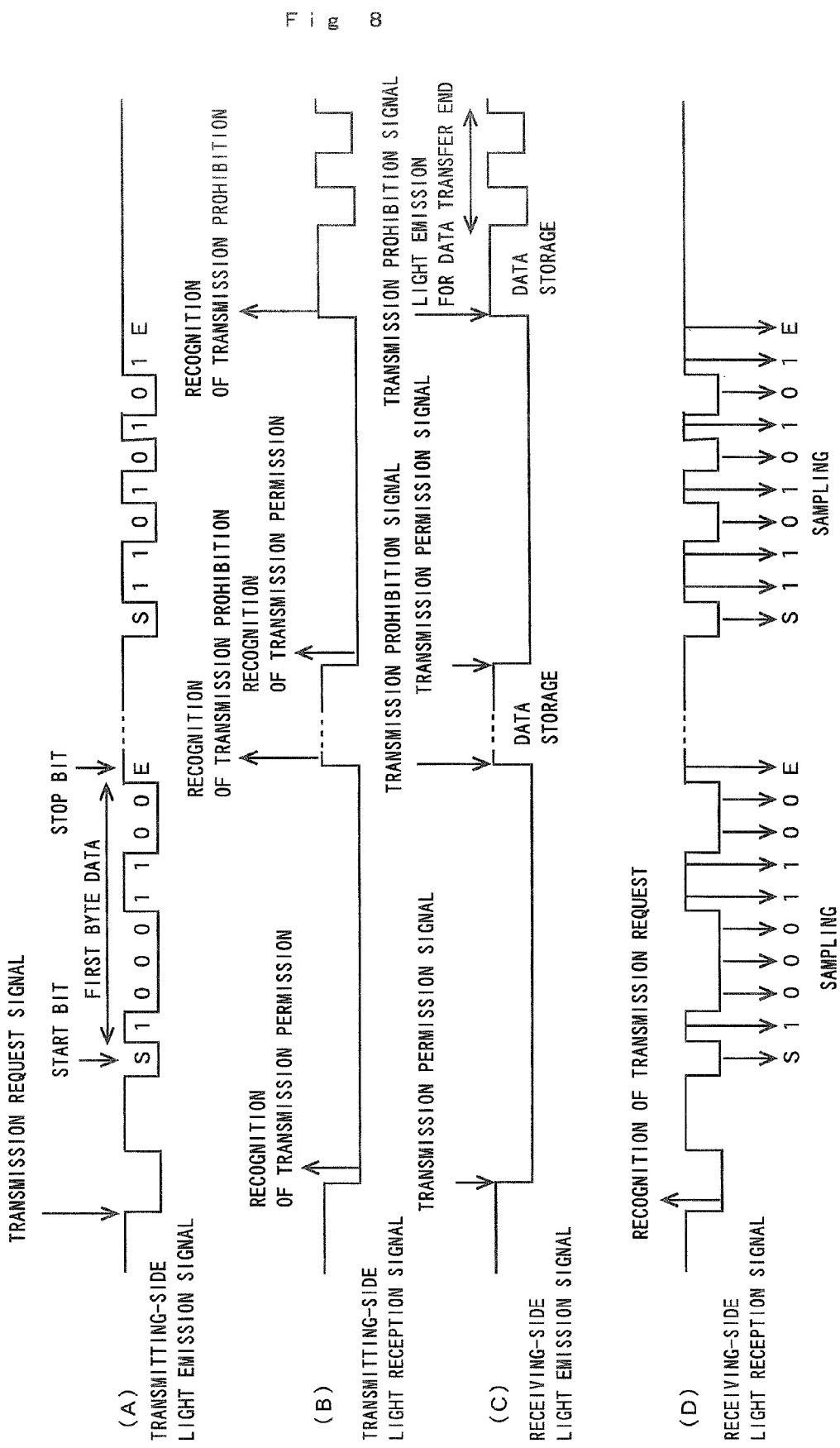
FIG. 8 is a timing chart showing the communication sequence executed for image data transmission/reception between the swing-type aerial display device in FIG. 5 and another swing-type aerial display device.

FIG. 8 is a timing chart showing the communication sequence that is executed when image data is transmitted/received between the swing-type aerial display device in FIG. 5 and another swing-type aerial display device. In the example in FIG. 8, the transmission control part 5 transmits data by start-stop synchronous communication (asynchronous communication) as shown in (A). The transmission control part 5 first transmits a start bit "0", subsequently transmits one-byte (8-bit) pixel data, and subsequently transmits a stop bit "1".

When receiving the one-byte pixel data, the other swing-type aerial display device transmits a transmission prohibition signal as shown in (C). The other swing-type aerial display device extinguishes the light-emitting diode 11. The other swing-type aerial display device stores the received one-byte pixel data in the memory 132. Thereafter, the other swing-type aerial display device intermittently lights the light-emitting diode 11 by pulse driving, thereby permitting the transmission of the next one-byte pixel data.

When notified of the transmission permission by the reception control part 6 based on the intermittent lighting of the light-emitting diode 11 by the pulse driving, the communication control part 133 reads the next one-byte pixel data of the image data stored in the memory 132 and causes the transmission control part 5 to transmit the pixel data.

The communication control part 133 repeats the above-described image data transmission process for each one-byte pixel data. When the transmission of all the pixel data of one image data stored in the memory 132 is completed, the communication control part 133 instructs the transmission control part 5 to transmit a data transfer end signal. The transmission control part 5 pulse-drives the light-emitting diode 11 so that the light-emitting diode 11 intermittently emits light in a predetermined pattern for notifying the data transfer end.

Consequently, the swing-type aerial display device is capable of transmitting the image data stored in the memory 132 to the other swing-type aerial display device by using the light-emitting diode 11. The other swing-type aerial display device is capable of receiving the image data transmitted by the swing-type aerial display device, by using the light-emitting diode.

The mode determining part 131 determines that the operation mode is the reception mode when the power switch 123 is set to the scan mode power ON and in this state, light in a predetermined pattern indicating a transmission request is received from another swing-type aerial display device before the scan button 124 is operated. The mode determining part 131 instructs the communication control part 133 to execute a process of storing in the memory 132 image data based on a signal received by the light-emitting diode 11.

In the reception mode, the communication control part 133 instructs the transmission control part 5 to transmit a transmission permission signal as shown in (C) in FIG. 8. The transmission control part 5 causes the light-emitting diode 11 to intermittently emit light by pulse driving.

When the light-emitting diode 11 receives the light in a predetermined light emission pattern, the reception control part 6 supplies the communication control part 133 with a value according to the pattern of the received light. When supplied with the value according to the pattern of the received light from the reception control part 6, the communication control part 133 instructs the transmission control part 5 to transmit a transmission prohibition signal as shown in (D) in FIG. 8. The transmission control part 5 extinguishes the light-emitting diode 11.

After instructing the transmission of the transmission prohibition signal, the communication control part 131 stores in the memory 132 the value supplied from the reception control part 6. When the storage of the reception data in the memory 132 is finished, the communication control part 133 instructs the transmission control part 5 to transmit a transmission permission signal. The transmission control part 5 causes the light-emitting diode 11 to intermittently emit light by pulse driving.

Consequently, the communication control part 133 is capable of receiving the image data to store it in the memory 132 in sequence for each one-byte pixel data.

When the light-emitting diode 11 receives light in a predetermined light emission pattern indicating data transfer end, the reception control part 6 notifies the data transfer end to the communication control part 133. The communication control part 133 instructs the transmission control part 5 to transmit a transmission prohibition signal. The transmission control part 5 extinguishes the light-emitting diode 11.

Consequently, one image data received by the light-emitting diode 11 is stored in the memory 132.

Incidentally, the transmission control part 5 may add all the received byte data to transmit the operation result as checksum data of the reception data to the transmitting-end swing-type aerial display device. Consequently, the transmitting-end swing-type aerial display device is capable of more correctly determining whether or not the image data has been correctly transmitted.

As described above, by using one light-emitting diode 11, the swing-type aerial display device according to the embodiment 3 is capable of transmitting image data stored in the memory 132 to another swing-type aerial display device and receiving image data to be stored in the memory 132 from another swing-type aerial display device.

Further, in the swing-type aerial display device according to the embodiment 3, the separation circuit 14 and the light reception circuit 137 are connected to the same input terminal as shown in FIG. 7. That is, in the swing-type aerial display device according to the embodiment 3, input of image data to the microcomputer 1 at the time of image read and input of image data to the microcomputer 1 at the time of image data reception are both serial input, whereby the input terminal is shared for both. Therefore, it is possible to reduce the necessary number of pins of the microcomputer 1.

Incidentally, in the embodiment 3, the swing-type aerial display device forms a residual image based on image data when waved by a hand. But, it should be noted that the swing-type aerial display device may be a residual image forming tool that is automatically waved by a machine or that is automatically rotated by a machine.

Embodiment 4

Figure 9:
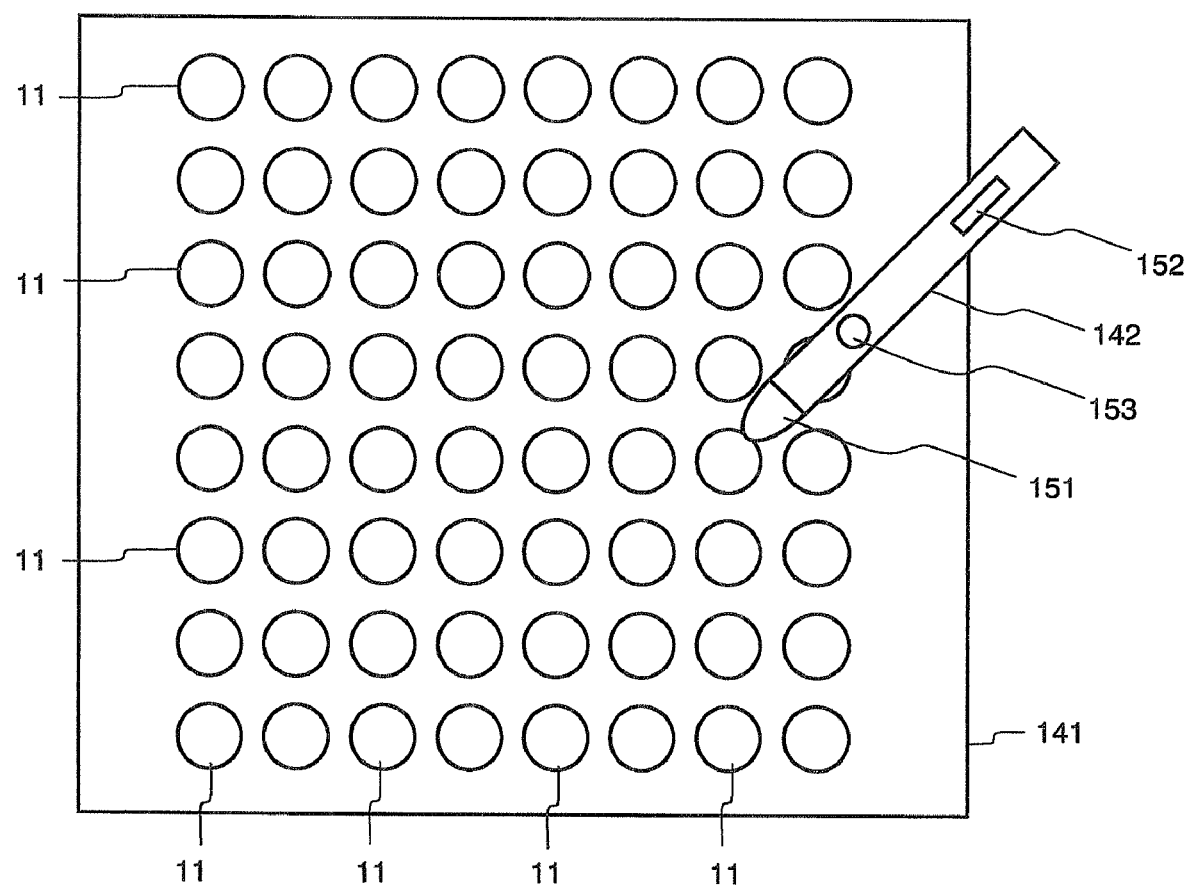
FIG. 9 is a front view showing a display panel device using a light-emitting diode for data communication, which is a kind of an electronic device according to an embodiment 4 of the present invention, and an input pen attached thereto.
Figure 10:
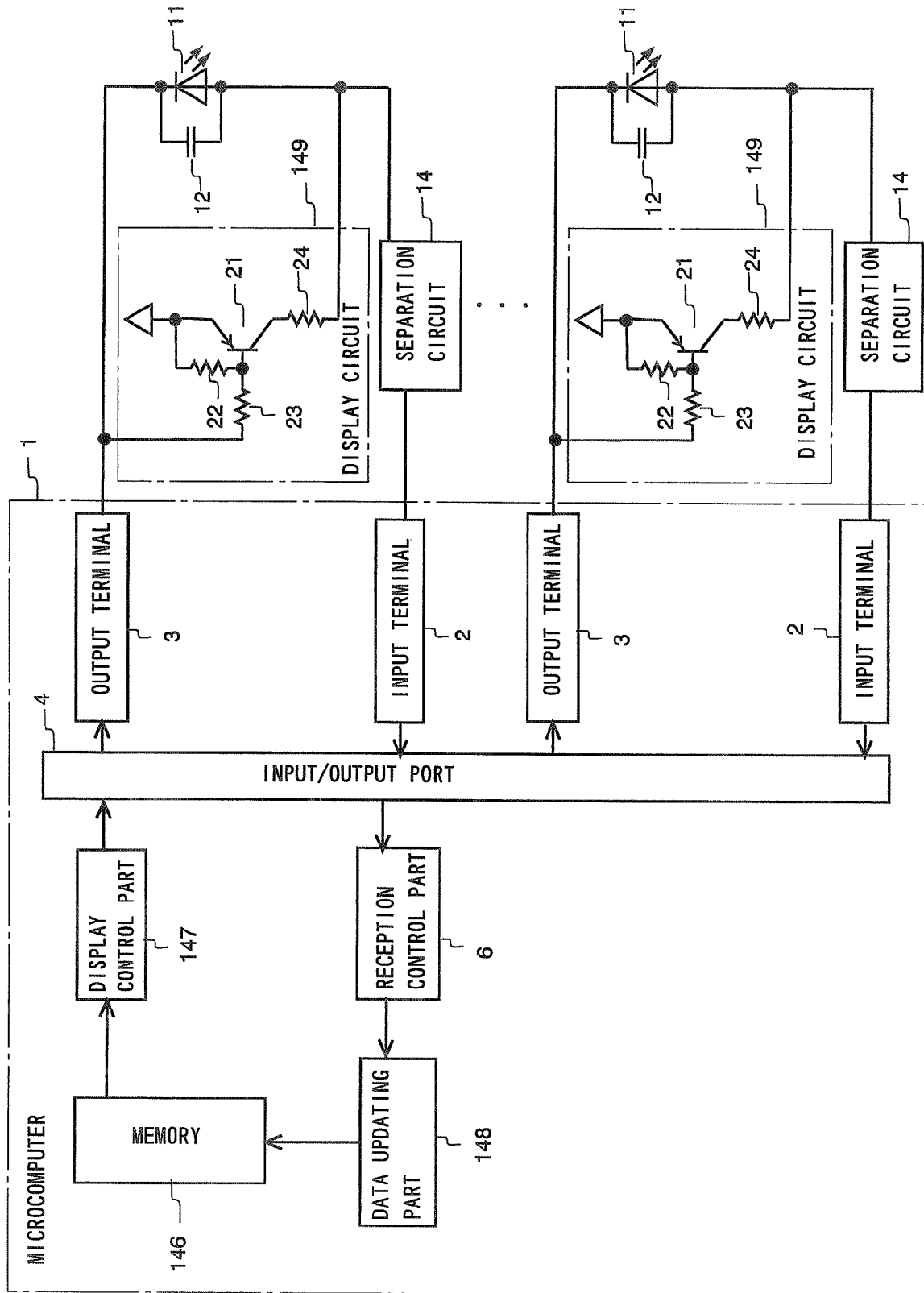
FIG. 10 is a block diagram of an electronic circuit of the display panel device.

FIG. 9 is a front view showing a display panel device 141 being a kind of an electronic device according to the embodiment 4 of the present invention and an input pen 142 attached thereto. FIG. 10 is a block diagram of an electronic circuit of the display panel device 141 in FIG. 9. The display panel device 141 uses display light-emitting diodes 11 for data reception.

The display panel device 141 has the plural light-emitting diodes 11. The plural light-emitting diodes 11 are arranged longitudinally and laterally in matrix, for example, in 8 columns×8 rows matrix. The light-emitting diodes 11 emit, for example, red visible light.

The display panel device 141 has a microcomputer 1. The microcomputer 1 has a memory 146. The memory 146 stores display data made up of bit data corresponding to each of the light-emitting diodes 11. In the microcomputer 1, a display control part 147 and a data updating part 148 are realized in addition to a reception control part 6. The display panel device 141 has the same number of display circuits 149, parallel capacitors 12, separation circuits 14, and so on as the number of the light-emitting diodes 11. The same plural number of sets of circuits as the number of the light-emitting diodes 11 are connected to the microcomputer 1. The display circuits 149, the parallel capacitors 12, and the separation circuits 14 are provided in correspondence to the respective light-emitting diodes 11.

Each of the display circuits 149 has a PNP transistor 21, a first resistor element 22, a second resistor element 23, and a protective resistor element 24.

The PNP transistor 21 turns on when a potential of its base node becomes lower than a potential of its emitter node, and a current flows from the emitter node to a collector node. The emitter node of the PNP transistor 21 is connected to a power source. The collector node of the PNP transistor 21 is connected to one node of the protective resistor element 24. The other node of the protective resistor element 24 is connected to an anode node of the light-emitting diode 11 and one node of the parallel capacitor 12.

The base node of the PNP transistor 21 is connected to one node of the first resistor element 22 and one node of the second resistor element 23. The other node of the first resistor element 22 is connected to the power source The other node of the second resistor element 23 together with a cathode node of the light-emitting diode 11 and the other node of the parallel capacitor 12 is connected to an output terminal 3 of the microcomputer 1.

The display control part 147 controls lighting of the plural light-emitting diodes 11 based on the display data stored in the memory 146.

Based on reception data that is outputted by the reception control part 6 based on light received by each of the light-emitting diodes 11, the data updating part 148 updates the bit data corresponding to the relevant light-emitting diode 11.

Constituent elements other than those described above have the same functions as those of the constituent elements with the same names in the embodiment 1 and are denoted by the same reference numerals as those of the embodiment 1, and description thereof will be omitted.

The operation of the display panel device 141 according to the embodiment 4 as configured above will be described next.

The display control part 147 reads the display data stored in the memory 146. When the output terminal 3 has bit data, out of the display data, corresponding to the light-emitting diode 11 that is to be lighted, the display control part 147 intermittently controls the output terminal 3 to low level.

When the output terminal 3 is controlled to low level, the PNP transistor 21 of the display circuit 149 turns on. A current of the collector node of the PNP transistor 21 causes the light-emitting diode 11 to emit light. Because of the intermittent control of the output terminal 3 to low level, the light emitting diode 11 intermittently emits light.

When the output terminal 3 is intermittently controlled to low level by, for example, a frequency of 38 kHz and 50% duty ratio, the light-emitting diode 11 appears to human eyes as if it is continuously lighted even though it is intermittently lighted.

Figure 11:
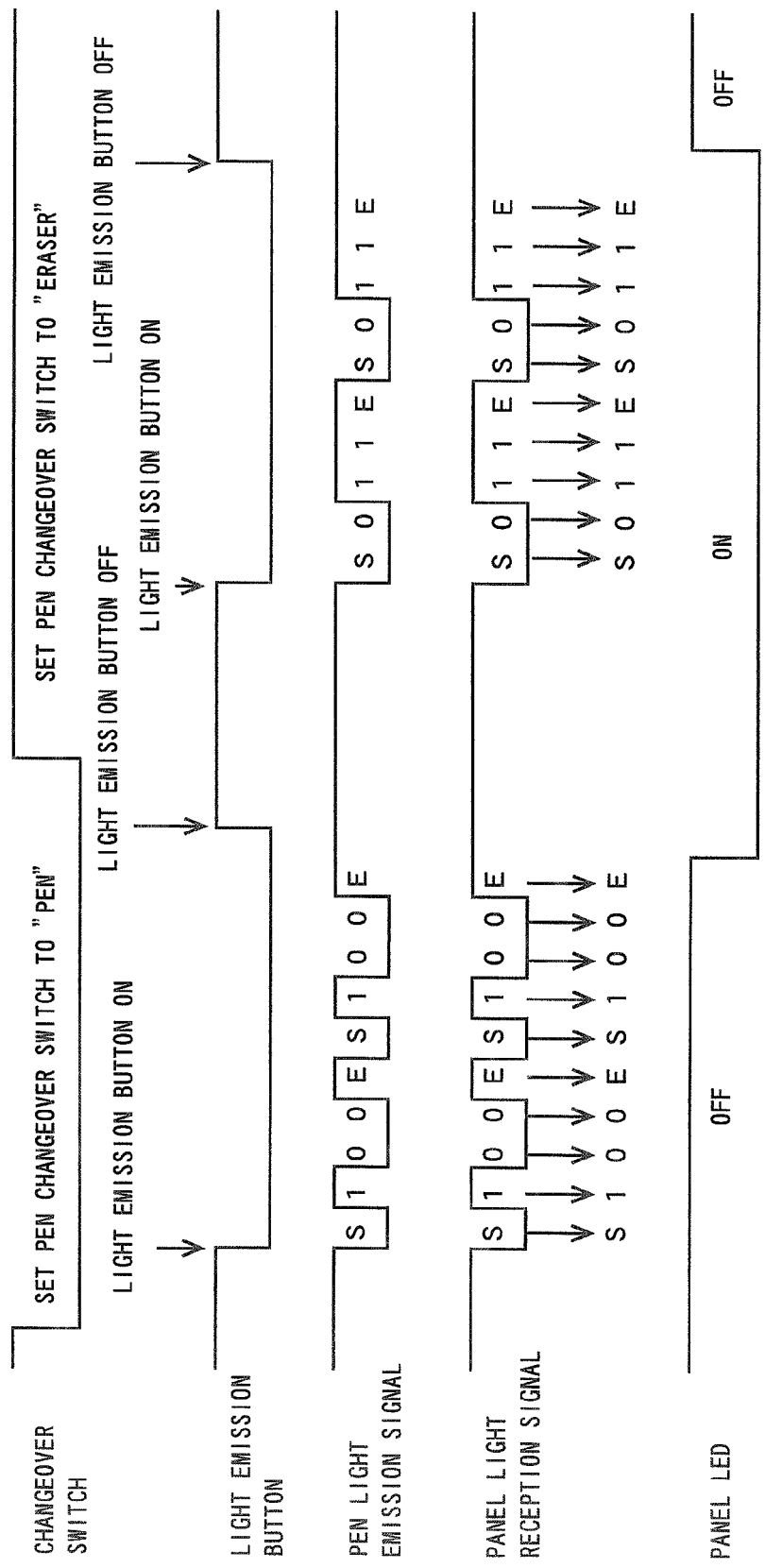
FIG. 11 is a timing chart showing the sequence of a communication procedure executed between one light-emitting diode of the display panel device and the input pen.

FIG. 11 shows the sequence of a communication procedure executed between one of the light-emitting diodes 11 of the display panel device 141 and the input pen 142.

The input pen 142 has a write LED 151 outputting visible light with the same wavelength as the wavelength of light emitted by the light-emitting diode 11, a pen changeover switch 152, and a light emission button 153.

When "pen (write)" is selected by the pen changeover switch 152 and in this state, the light emission button 153 is operated, the input pen 142 transmits predetermined write data. The input pen 142 transmits the write data consisting of, for example, a bit array "100" two consecutive times.

When an optical signal based on such write data is inputted, the reception control part 6 generates write data based on an output of the separation circuit 14. When the two write data are continuously generated by the reception control part 6, bit data stored in the memory 146 and corresponding to the light-emitting diode 11 to which the bit data has been written is updated by the data updating part 148 to a value indicating lighting.

Consequently, the light-emitting diode 11 to which the write data have been written by the input pen 142 is lighted. The light-emitting diode 11 is controlled to be intermittently lighted but appears to human eyes as if it is constantly lighted due to a residual image effect.

When "eraser (erase)" is selected by the pen changeover switch 152 and in this state, the light emission button 153 is operated, the input pen 142 transmits predetermined erase data. The input pen 142 transmits the erase data consisting of, for example, "011" two consecutive times.

When an optical signal based on such erase data is inputted, the reception control part 6 generates erase data based on an output of the separation circuit 14. When the two erase data are continuously generated by the reception control part 6, the bit data stored in the memory 146 and corresponding to the light-emitting diode 11 to which the data have been written is updated by the data updating part 148 to a value indicating extinction.

Consequently, the light-emitting diode 11 to which the erase data have been written by the input pen 142 is extinguished.

As described above, the display panel device 141 according to the embodiment 4 writes the write data by using the input pen 142 to each of the plural light-emitting diodes 11 arranged in matrix, thereby lighting the light-emitting diode 11 to which the data have been written. During the light-on period, the erase data are written to the light-emitting diode 11 with the input pen 142, but because the light-emitting diode 11 is intermittently lighted, it can be extinguished.

The plural light-emitting diodes 11 of the display panel device 141 can be freely lighted or extinguished one by one by the input pen 142. That is, a user can freely draw a character or a picture on the display panel device 141 as he/she likes by using the input pen 142, and the plural light-emitting diodes 11 of the display panel device 141 can be lighted so as to trace the drawn character or picture.

The above-described embodiments are examples of preferable embodiments of the present invention, but the present invention is not limited to these embodiments, and various modifications and changes can be made therein without departing from the spirits of the present invention.

In the embodiments 1 and 2 described above, the communication between the electronic devices is described as an example. In the embodiment 3, the communication between the swing-type aerial display devices which are a kind of residual image forming tools is described as an example. In the embodiment 4, the communication between the display panel device and the input pen is described as an example.

Figure 12:
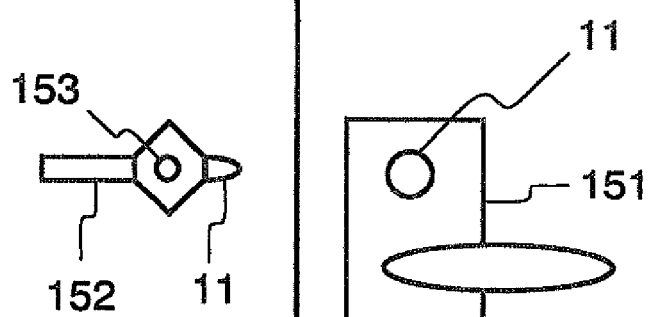
FIG. 12 is an explanatory view showing an electronic locking device and a key unit being a modification example of the embodiment of the present invention.

The present invention is also applicable to an electronic locking device controlling locking and unlocking of a door, a key unit used in combination with the electronic locking device, and so on, and can be utilized in their communication for authentication. FIG. 12 is an explanatory view showing an electronic locking device 151 and a key unit 152 being a modification example of the embodiments of the present invention. The electronic locking device 151 has a light-emitting diode 11. The key unit 152 also has a light-emitting diode 11.

Figure 13:
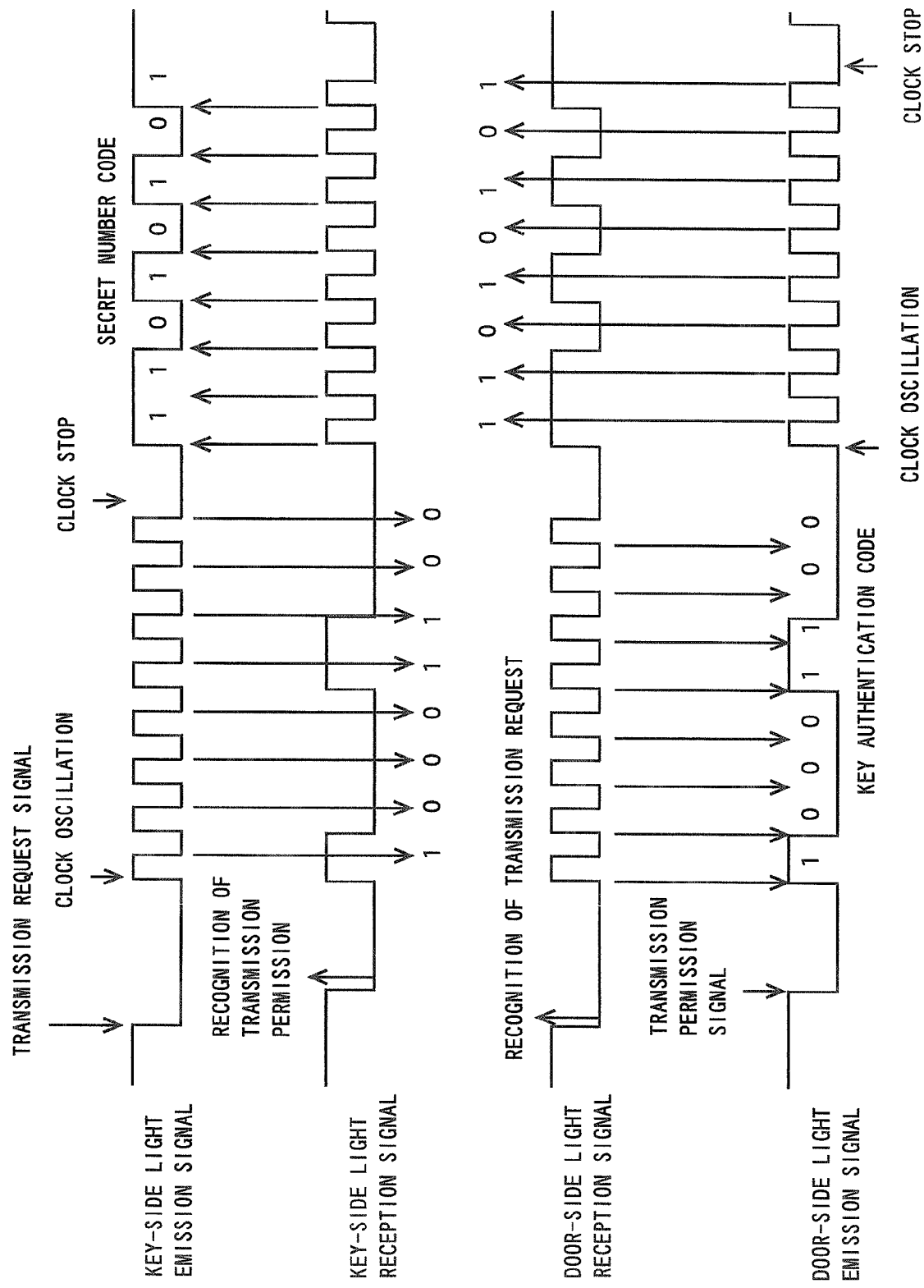
FIG. 13 is a timing chart showing the sequence of a communication procedure executed between the electronic locking device and the key unit in FIG. 12.

The above electronic locking device 151 and key unit 152 transmit/receive, for example, a key authentication code and a secret number code as shown in FIG. 13 by controlling light emission of the respective light-emitting diodes 11. FIG. 13 shows the sequence of a communication procedure executed between the electronic locking device 151 and the key unit 152 in FIG. 12

The key unit 152 outputs a light emission signal indicating a transmission request, in response to the operation of a key check button 153. The light-emitting diode 11 of the key unit 152 is pulse-driven to intermittently emit light.

Upon receiving the light emission signal indicating the transmission request, the electronic locking device 151 outputs a light emission signal indicating transmission permission. The light-emitting diode 11 of the electronic locking device 151 is pulse-driven to intermittently emit light.

Upon receiving the light emission signal indicating the transmission permission, the key unit 152 causes the light-emitting diode 11 to periodically emit light by the repetition of a light emission period and a non-light emission period. This becomes a synchronous clock signal. Incidentally, the light-emitting diode 11 is also pulse-driven to intermittently emit light in the light emission period.

When the light-emitting diode 11 of the electronic locking device 151 receives the synchronous clock signal of the key unit 152, the electronic locking device 151 causes the light-emitting diode 11 to emit light in synchronization with a period of the synchronous clock signal to transmit a key authentication code unique to the electronic locking device 151 registered in advance by a maker or the like. In the example in FIG. 13, the key authentication code is "10001100 (=8Ch)".

When the light-emitting diode 11 of the key unit 152 receives the key authentication code, the key unit 152 determines whether or not the received key authentication code matches a key authentication code of the electronic locking device 151 corresponding to the key unit 152.

After transmitting the key authentication code, the electronic locking device 151 causes the light-emitting diode 111 to emit light, thereby transmitting a synchronous clock signal.

In the previous matching determination of the key authentication codes, if determining that the key authentication codes match each other, the key unit 152 transmits a secret number code unique to the key unit 152 registered in advance by a user, in synchronization with a period of the synchronous clock signal of the electronic locking device 151 when receiving the synchronous clock signal by its light-emitting diode 11. In the example in FIG. 13, the secret number code is "11010101 (=D5h)".

If determining that the key authentication codes do not match each other in the previous matching determination of the key authentication code, the key unit 152 does not transmit the secret number code even if the light-emitting diode 11 receives the synchronous clock signal of the electronic locking device 151. This can prevent improper transmission of the secret number code.

When the light-emitting diode 11 receives the secret number code, the electronic locking device 151 determines whether or not the received secret number code matches a secret number code registered in advance by the user. If the received secret number code matches the secret number code registered in advance, the electronic locking device 151 unlocks the door. Otherwise, the electronic locking device 151 keeps the door locked.

Through the above-described authentication processes, the electronic locking device 151 can authenticate only the key unit 152 registered in advance to unlock the door.

Incidentally, the transmission of the key authentication code from the electronic locking device 151 to the key unit 152 has the following significance. In the specification in which the key authentication code is transmitted from the key unit 152, if the key unit 152 is stolen, the key authentication code can be easily obtained based on an output signal of the key unit 152. On the other hand, in the specification in which the key authentication code is transmitted to the key unit 152 from the electronic locking device 151, no optical signal based on the key authentication code is outputted from the key unit 152. The key unit 152 does not transmit the secret number code unless it determines that the key authentication codes match each other. This can prevent security deterioration due to the loss or the like of the key unit 152.

The present invention is applicable not only to the combination of the electronic locking device 151 and the key unit 152 but also to various broadcast receivers such as television sets, personal computers, game machines, lighting devices, air conditioners, hot water suppliers, microwave ovens, cameras, household electric apparatus, automobiles, motorcycles, portable telephone terminals, portable information devices, portable game machines, evaluation boards, and so on. For example, in a camera, by utilizing an AF (Auto Focus) auxiliary light LED, it is possible to transmit data in an internal EEPROM mounted on a control board of the camera or receive data to write the data in the EEPROM.

In the above-described embodiments, as a driving transistor for lighting the light-emitting diode 11, the PNP transistor is used. An FET (Field Effect Transistor) or the like instead of the PNP transistor is another example usable as the driving transistor, if communication speed or the like may be low.

What is claimed is:

1. A data communication unit using a light-emitting diode for data communication, comprising:
    a light-emitting diode outputting light when a current flows therethrough;
    a transmission circuit applying a forward bias to said light-emitting diode based on transmission data; and
    a separation circuit outputting a first voltage that changes according to a second voltage which is generated in said light-emitting diode when the forward bias is not applied to said light-emitting diode,
    wherein said transmission circuit causes said light-emitting diode to transmit optical transmission data, and said separation circuit takes out the voltage generated in said light-emitting diode, as data, and wherein said separation circuit includes means for separating data having different frequency from a pulse frequency of optical data transmitting from said transmission circuit wherein said transmission circuit has a PNP transistor having a base node connected to a cathode node of said light-emitting diode and has a collector node connected to an anode node of said light-emitting diode, and when applying the forward bias to said light-emitting diode, said transmission circuit controls potentials of said cathode node of said light-emitting diode and said base node of said PNP transistor to a value lower than a voltage of an emitter node of said PNP transistor, thereby turning on said PNP transistor, and wherein said separation circuit is connected to said anode node of said light-emitting diode.

2. A data communication unit using a light-emitting diode for data communication, comprising:
   a light-emitting diode outputting light when a current flows therethrough;
   a transmission circuit applying a forward bias to said light-emitting diode based on transmission data and
   a separation circuit outputting a first voltage that changes according to a second voltage which is generated in said light-emitting diode when the forward bias is not applied to said light-emitting diode,
   wherein said transmission circuit causes said light-emitting diode to transmit optical transmission data, and said separation circuit takes out the voltage generated in said light-emitting diode, as data, and wherein said separation circuit has: a separation transistor; a DC removing capacitor connected between a base node of said separation transistor and an anode node of said light-emitting diode; an operating point setting circuit that has a pair of resistor elements connected to said base node of said separation transistor and sets an operating potential of said separation transistor so as to cause said separation transistor to perform a current amplifying operation according to whether or not a predetermined amount of light is incident on said light-emitting diode; and a separation resistor element connected to a collector node of said separation transistor.

3. The data communication unit using said light-emitting diode for data communication according to claim 2, wherein said separation circuit has: an amplifier transistor having a collector node connected to said base node of said separation transistor and a base node connected to said DC removing capacitor; and a low pass filter circuit removing a high-frequency component from a voltage of said separation resistor element.

4. The data communication unit using the light-emitting diode for data communication according to claim 3,
   wherein said means for separating data comprises of said low pass filter circuit to allow passage of a frequency component whose period is different from a period of a frequency based on which said transmission circuit applies the forward bias to said light-emitting diode.

* * * * *